(12) United States Patent
Hiatt et al.

(10) Patent No.: US 10,255,263 B2
(45) Date of Patent: Apr. 9, 2019

(54) DATA STORAGE AND RETRIEVAL SYSTEM AND METHOD FOR STORING CELL COORDINATES IN A COMPUTER MEMORY

(71) Applicant: WORKIVA INC., Ames, IA (US)

(72) Inventors: Dustin Lee Hiatt, Charlestown, SC (US); Travis Lee Smith, Ames, IA (US); John Pillar, Midland, GA (US); Joshua Allen Beam, Columbus, GA (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 15/922,424

(22) Filed: Mar. 15, 2018

(65) Prior Publication Data

US 2018/0203838 A1 Jul. 19, 2018

Related U.S. Application Data

(63) Continuation-in-part of application No. 15/188,200, filed on Jun. 21, 2016, now Pat. No. 10,019,433.
(Continued)

(51) Int. Cl.
*G06F 17/22* (2006.01)
*G06F 17/24* (2006.01)
(Continued)

(52) U.S. Cl.
CPC ........ *G06F 17/246* (2013.01); *G06F 17/2247* (2013.01); *G06F 17/30327* (2013.01); *G06F 17/30598* (2013.01); *G06T 11/206* (2013.01)

(58) Field of Classification Search
CPC ............... G06F 17/246; G06F 17/2247; G06F 17/30327; G06F 17/30598; G06T 11/206
See application file for complete search history.

(56) References Cited

U.S. PATENT DOCUMENTS 5,603,021 A * 2/1997 Spencer ................. G06F 17/246
5,883,623 A * 3/1999 Cseri ...................... G06F 3/0481
715/866
(Continued)

FOREIGN PATENT DOCUMENTS

WO 2008/107665 A2 9/2008

OTHER PUBLICATIONS

Bewig, "How do you know your spreadsheet is right? Principles, Techniques and Practice of Spreadsheet Style," <http://www.eusprig.org/hdykysir.pdf>, Jul. 28, 2005, 14 pages.
(Continued)

*Primary Examiner* — Maikhanh Nguyen
(74) *Attorney, Agent, or Firm* — Drinker Biddle & Reath LLP

(57) ABSTRACT

In an embodiment, a data storage and retrieval system includes a computing device that configures the computer memory according to an RTree (a type of logic tree) representing a structure of a spreadsheet. The computer memory may be internal to or external to the computing device. In an embodiment, the RTree has a plurality of nodes, at least some of which contain one or more minimum bounding rectangles. Each minimum bounding rectangle ("MBR") encompasses cells of the spreadsheet from a different one of a plurality of columns of the spreadsheet, but does not encompass cells of any of the other columns of the plurality of columns. A node of the RTree may hold multiple MBRs or a single MBR.

9 Claims, 24 Drawing Sheets

Related U.S. Application Data which is a continuation of application No. 14/850,156, filed on Sep. 10, 2015, now Pat. No. 9,378,269, which is a continuation of application No. 14/714,845, filed on May 18, 2015, now Pat. No. 9,158,832.

(51) Int. Cl.
*G06T 11/20* (2006.01)
*G06F 17/30* (2006.01)

(56) References Cited

U.S. PATENT DOCUMENTS

| | | | |
|---|---|---|---|
| 6,057,837 | A | 5/2000 | Hatakeda et al. |
| 6,138,130 | A | 10/2000 | Adler et al. |
| 6,252,605 | B1 | 6/2001 | Beesley et al. |
| 6,460,059 | B1 | 10/2002 | Wisniewski |
| 6,741,998 | B2* | 5/2004 | Ruth ............... G06F 17/30893 702/21 |
| 6,909,965 | B1 | 6/2005 | Beesley et al. |
| 6,948,154 | B1* | 9/2005 | Rothermel ............ G06F 17/246 717/128 |
| 7,080,065 | B1 | 7/2006 | Kothuri et al. |
| 7,096,422 | B2* | 8/2006 | Rothschiller ....... G06F 17/2247 707/E17.125 |
| 7,181,467 | B2 | 2/2007 | Kothuri |
| 7,219,108 | B2 | 5/2007 | Kothuri et al. |
| 7,734,714 | B2 | 6/2010 | Rogers |
| 7,761,403 | B2 | 7/2010 | Witkowski et al. |
| 7,792,847 | B2 | 9/2010 | Dickerman et al. |
| 7,809,712 | B2 | 10/2010 | Witkowski et al. |
| 7,984,371 | B2 | 7/2011 | Zdenek |
| 8,307,337 | B2 | 11/2012 | Chamieh et al. |
| 8,335,783 | B2 | 12/2012 | Milby |
| 8,527,865 | B2 | 9/2013 | Li et al. |
| 8,607,207 | B2 | 12/2013 | Chamieh et al. |
| 8,645,929 | B2 | 2/2014 | Chamieh et al. |
| 8,707,156 | B2* | 4/2014 | Xue ...................... G06F 17/246 715/212 |
| 8,745,483 | B2 | 6/2014 | Chavoustie et al. |
| 8,849,834 | B2 | 9/2014 | Milby |
| 8,856,234 | B2 | 10/2014 | Kluin et al. |
| 8,869,020 | B2 | 10/2014 | Daga |
| 2002/0103825 | A1 | 8/2002 | Bauchot |
| 2003/0028545 | A1* | 2/2003 | Wang ................ G06F 17/30595 |
| 2004/0133567 | A1 | 7/2004 | Witkowski et al. |
| 2004/0172616 | A1* | 9/2004 | Rothschiller ....... G06F 17/2247 717/114 |
| 2004/0181543 | A1* | 9/2004 | Wu .................. G06F 17/30572 |
| 2004/0193615 | A1 | 9/2004 | Kothuri |
| 2006/0080594 | A1 | 4/2006 | Chavoustie et al. |
| 2006/0085386 | A1 | 4/2006 | Thanu et al. |
| 2006/0101324 | A1* | 5/2006 | Goldberg .............. G06F 17/245 715/227 |
| 2006/0224946 | A1 | 10/2006 | Barrett et al. |
| 2007/0033519 | A1 | 2/2007 | Zdenek |
| 2007/0219956 | A1 | 9/2007 | Milton |
| 2008/0134138 | A1 | 6/2008 | Chamieh et al. |
| 2008/0148140 | A1 | 6/2008 | Nakano |
| 2008/0162532 | A1 | 7/2008 | Daga |
| 2009/0100324 | A1 | 4/2009 | Aureglia et al. |
| 2009/0150426 | A1 | 6/2009 | Cannon et al. |
| 2009/0182837 | A1 | 7/2009 | Rogers |
| 2009/0292730 | A1 | 11/2009 | Li et al. |
| 2010/0077331 | A1 | 3/2010 | Bargh et al. |
| 2010/0257439 | A1* | 10/2010 | Xue ...................... G06F 17/246 715/217 |
| 2013/0232475 | A1 | 9/2013 | Chamieh et al. |
| 2014/0188544 | A1 | 7/2014 | Senescu |

OTHER PUBLICATIONS

Burnett et al., "Testing Homogeneous Spreadsheet Grids with the "What You See Is What You Test" Methodology," IEEE Transactions on Software Engineering, Jun. 2002, vol. 28, No. 6, pp. 576-594.

Kamel et al., "Hilbert R-tree: An Improved R-tree Using Fractals," PVLDB '94 Proceedings of the 20th International Conference on Very Large Data Bases, Sep. 12-15, 1994, Morgan Kaufman Publishers Inc., San Francisco, CA, USA, 1994, pp. 500-509.

Kankuzi, "A Dynamic Graph-based Visualization for Spreadsheets," University of Bostwana, Faculty of Science, Department of Computer Science, <http://www.researchgate.net/profile/Yirsaw.Ayalew2/publication/234808991_A_dynamic_graph-based_visualization_for spreadsheets/links/00b7d51a9b5169d566000000.pdf>, Jun. 2008, 121 pages.

Kankuzi et al., "An End-User Oriented Graph-Based Visualization for Spreadsheets," Proceedings of the 4th International Workshop on End-user Software Engineering, WEUSE '08, May 12, 2008, Leipzig, Germany, ACM, 2008, pp. 86-90.

Rothermel et al., "A Methodology for Testing Spreadsheets," ACM Transactions on Software Engineering and Methodology, Jan. 2001, vol. 10, No. 1, pp. 110-147.

Sewall et al., "PALM: Parallel Architecture-Friendly Latch-Free Modifications to B+ Trees on Many-Core Processors," Proc. VLDB Endowment, 2011, pp. 795-806.

Guttman, "R-Trees: A Dynamic Index Structure for Spatial Searching," ACM, 1984, pp. 47-57.

* cited by examiner

| | A | B | C | D |
|---|---|---|---|---|
| 1 | | | | |
| 2 | Worksheet 1 | Income Statement | Current Period | |
| 3 | | Interest income | 45,000 | |
| 4 | | Non-interest income | 12,000 | |
| 5 | | Write down of real estate | (6,000) | |
| 6 | | Net income | 51,000 | |
| 7 | | | | |
| 8 | | | | |
| 9 | Worksheet 2 | Balance Sheet | Current Period | Prior Period |
| 10 | | Cash | 52,000 | 36,000 |
| 11 | | Real estate | 15,000 | 21,000 |
| 12 | | Total Assets | 67,000 | 57,000 |
| 13 | | | | |
| 14 | | | | |
| 15 | Worksheet 3 | Statement of Cash Flow | Current Period | |
| 16 | | Change in cash from operating activities | 16,000 | |
| 17 | | Net change in cash flows | 16,000 | |
| 18 | | Cash at beginning of period | 36,000 | |
| 19 | | Cash at end of period | 52,000 | |

|   | A | B | C | D |
|---|---|---|---|---|
| 1 | | | | |
| 2 | Worksheet 1 | Income Statement | Current Period | |
| 3 | | Interest income | 45,000 | |
| 4 | | Non-interest income | 12,000 | |
| 5 | | Write down of real estate | (6,000) | |
| 6 | | Net income | =sum(C3:C5) | |
| 7 | | | | |
| 8 | | | | |
| 9 | Worksheet 2 | Balance Sheet | Current Period | Prior Period |
| 10 | | Cash | link to source at C19 | 36,000 |
| 11 | | Real estate | =D11+C5 | 21,000 |
| 12 | | Total Assets | =sum(C3:C5) | =sum(D10:D11) |
| 13 | | | | |
| 14 | | | | |
| 15 | Worksheet 3 | Statement of Cash Flow | Current Period | |
| 16 | | Change in cash from operating activities | 16,000 | |
| 17 | | Net change in cash flows | =sum(C16) | |
| 18 | | Cash at beginning of period | link to source at D10 | |
| 19 | | Cash at end of period | =C18+C17 | |

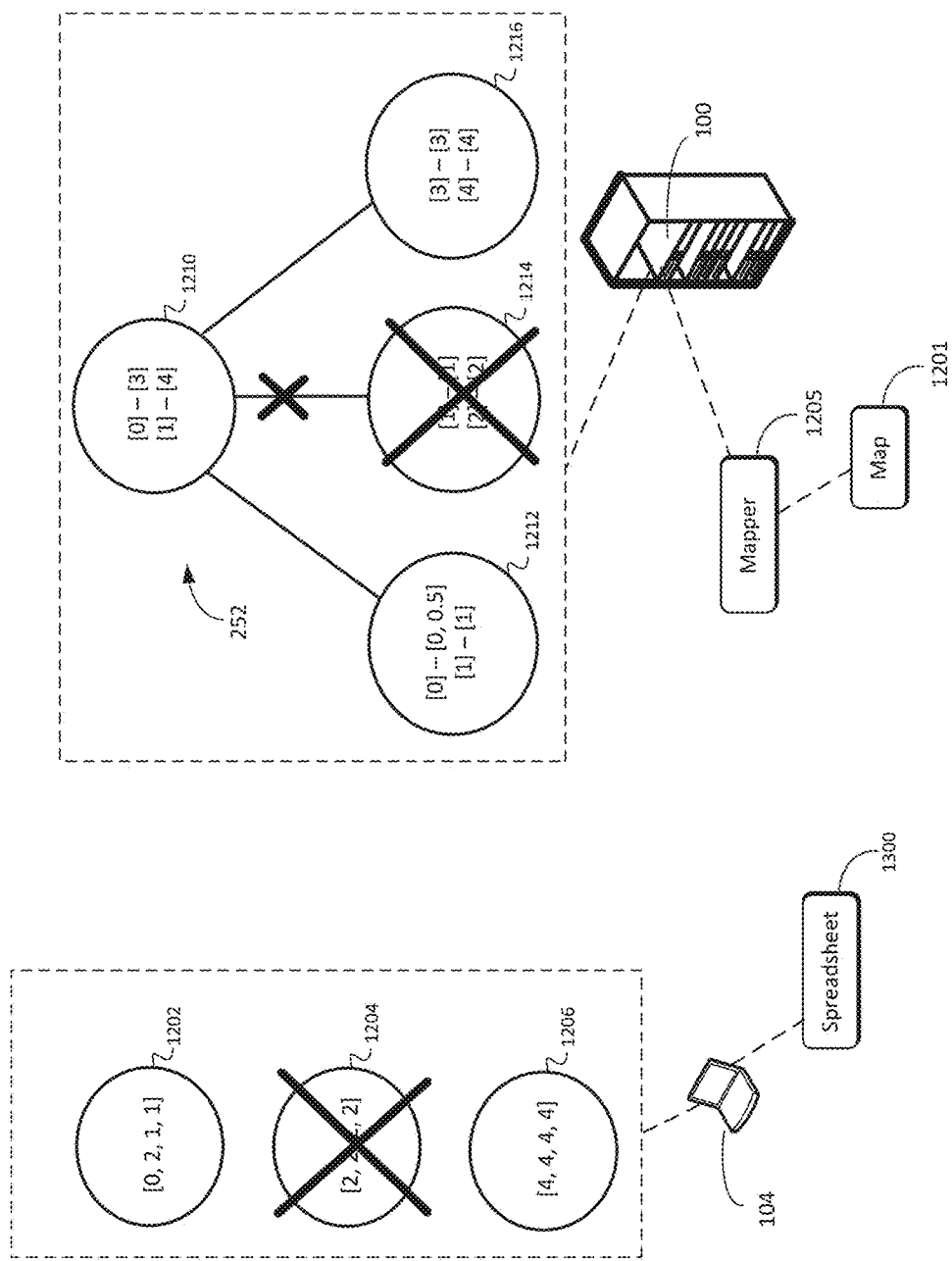

DATA STORAGE AND RETRIEVAL SYSTEM AND METHOD FOR STORING CELL COORDINATES IN A COMPUTER MEMORY

CROSS-REFERENCE TO RELATED APPLICATIONS

This application is a continuation-in-part of U.S. application Ser. No. 15/188,200, filed Jun. 21, 2016, which is a continuation of U.S. application Ser. No. 14/850,156, filed Sep. 10, 2015 (now U.S. Pat. No. 9,378,269), which is a continuation of U.S. application Ser. No. 14/714,845, filed May 18, 2015 (now U.S. Pat. No. 9,158,832). Each of the above documents is incorporated herein by reference in its entirety.

TECHNICAL FIELD

The present disclosure relates generally to data storage and retrieval, more particularly, to a data storage and retrieval system and method for storing cell coordinates in a computer memory.

BACKGROUND

Keeping track of different types of data entries and interdependencies among the different entries is a task for which computers are ideally suited, and modern society depends heavily on this capability. From social networking platforms to financial analysis applications, computers, along with robust communication networks, are able to propagate a change in one data item (e.g., a change in a cell of a spreadsheet or a change in a user's status on a social network) to other data items (e.g., a recalculation of a formula in a spreadsheet or an update of an emoticon on the devices of the user's friends).

One problem that arises with propagating changes among many interdependent data entries is that it can be very slow when the number of entries and interdependencies is high and when the entries are stored across different documents, databases, servers and different geographical locations of the servers. For example, those who work with large spreadsheets are familiar with the experience in which, when a change is made to one cell of a spreadsheet, the spreadsheet program spends a long time updating itself repeatedly as the formulas depending on the changed cell get recalculated, the formulas depending on those formulas get recalculated, and so on. Dependencies that cross documents or servers create similar delays.

DRAWINGS

While the appended claims set forth the features of the present techniques with particularity, these techniques, together with their objects and advantages, may be best understood from the following detailed description taken in conjunction with the accompanying drawings of which:

Figure 9C:
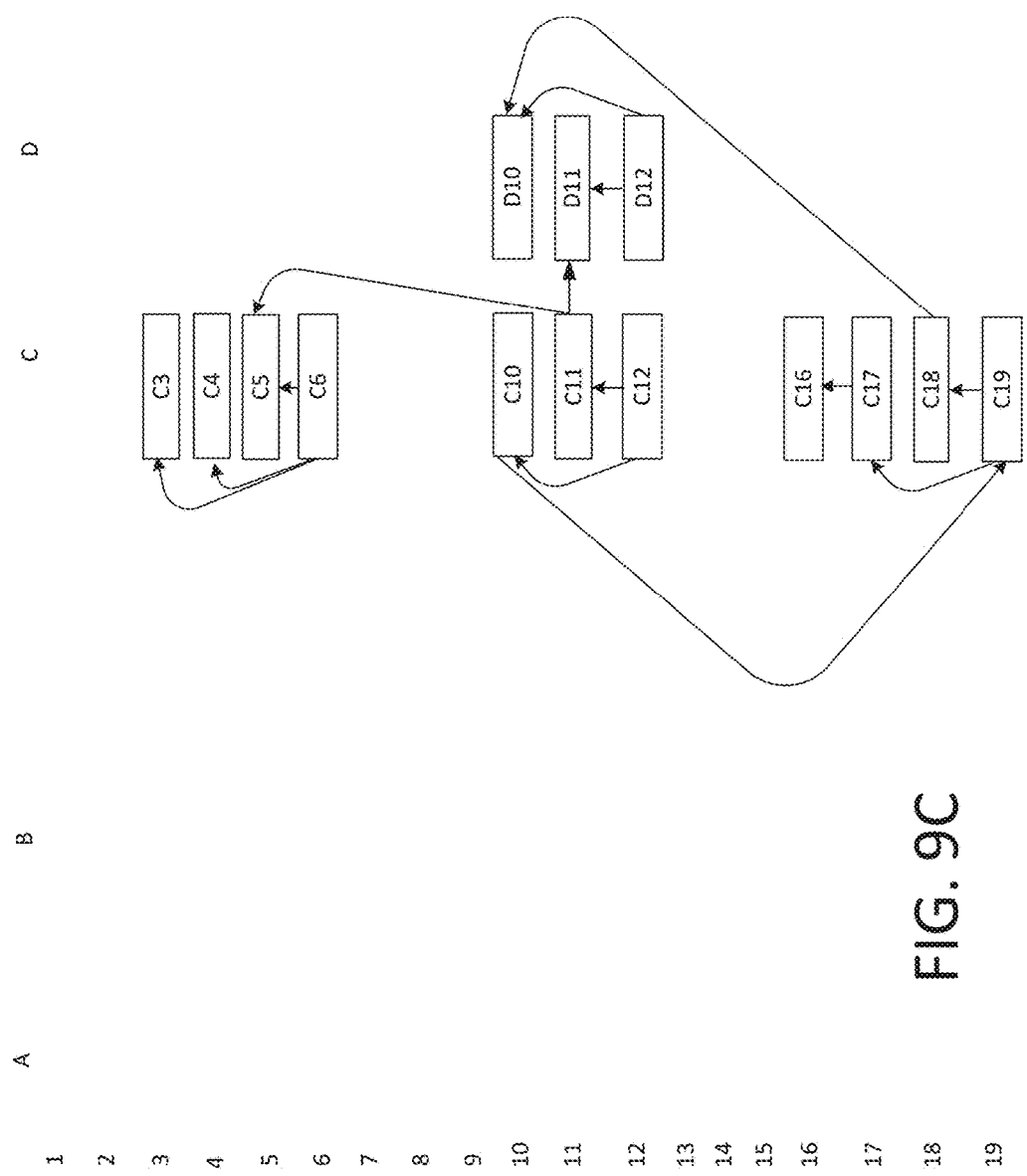

FIG. 9A, FIG. 9B, and FIG. 9C show another spreadsheet on a user interface to help illustrate another embodiment.

Figure 10A:
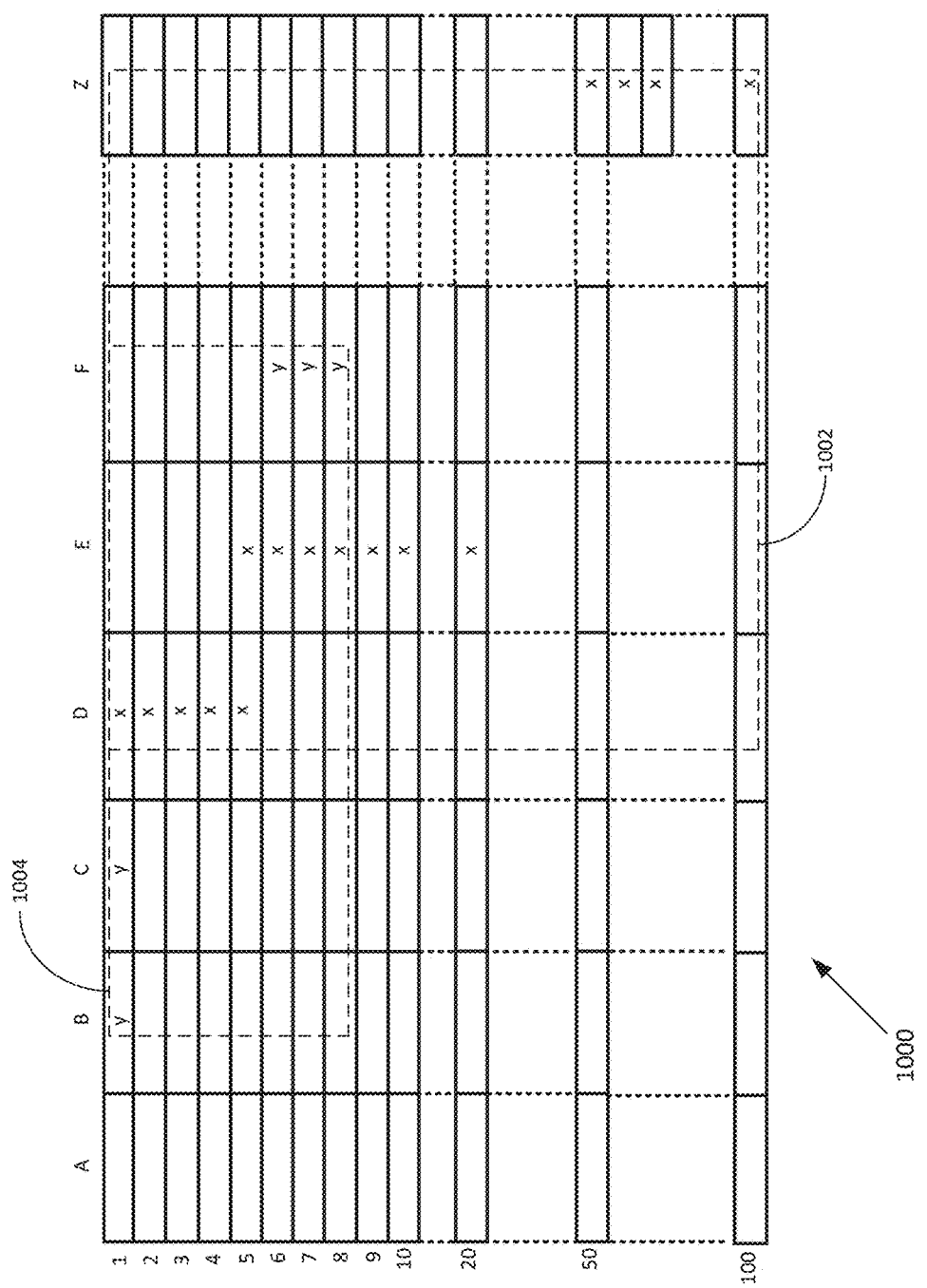
Figure 10B:
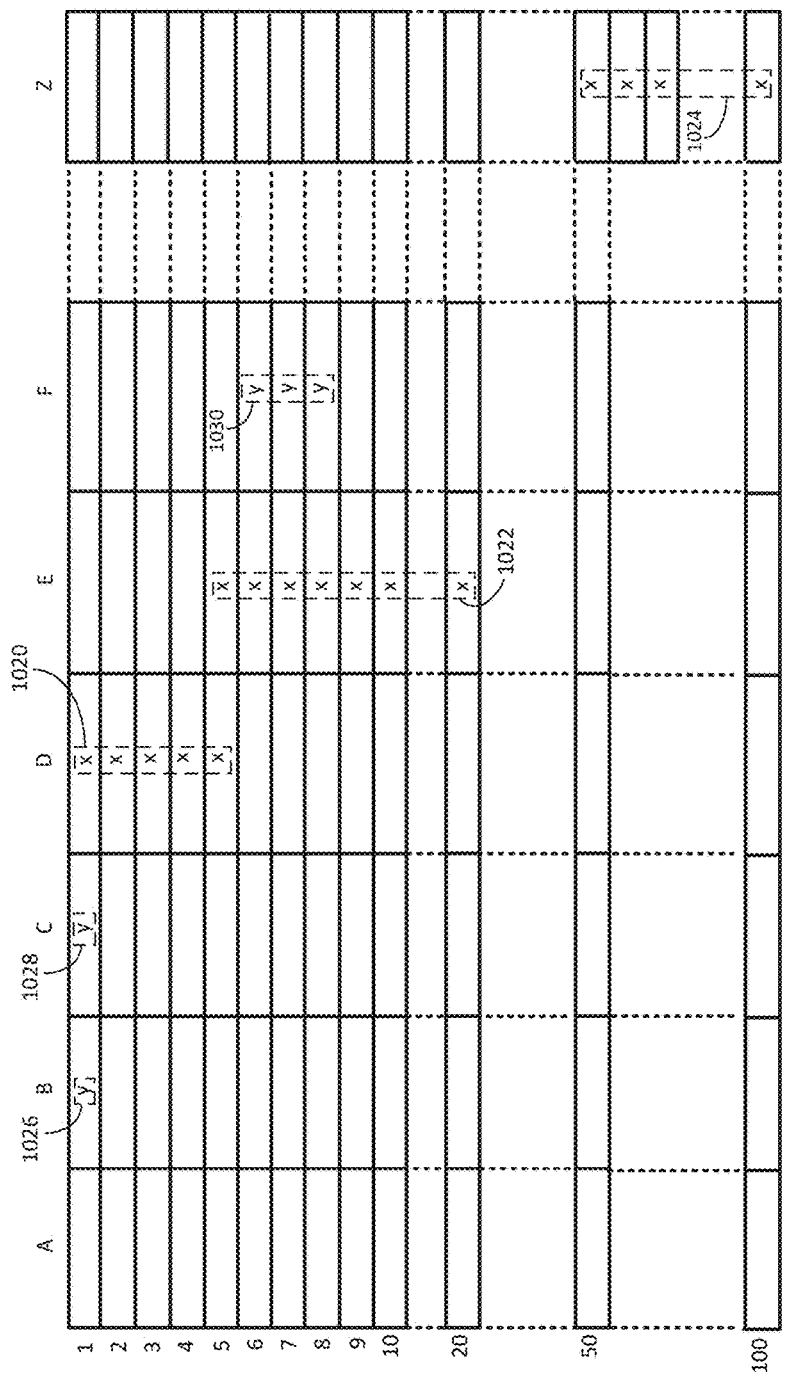

FIG. 10A and FIG. 10B depict example spreadsheets to help illustrate minimum bounding rectangles according to an embodiment.

Figure 11A:
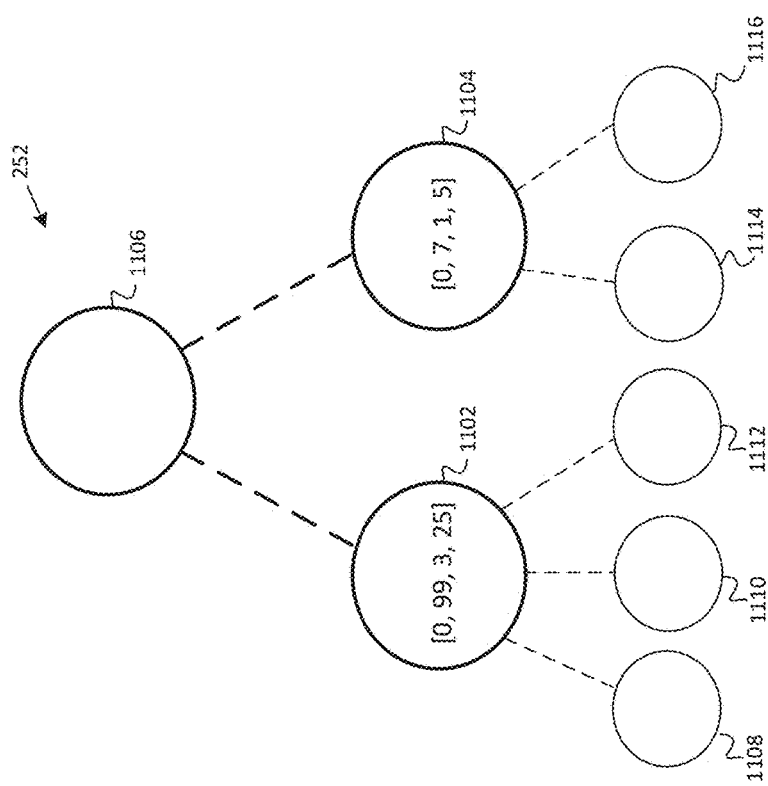
Figure 11B:
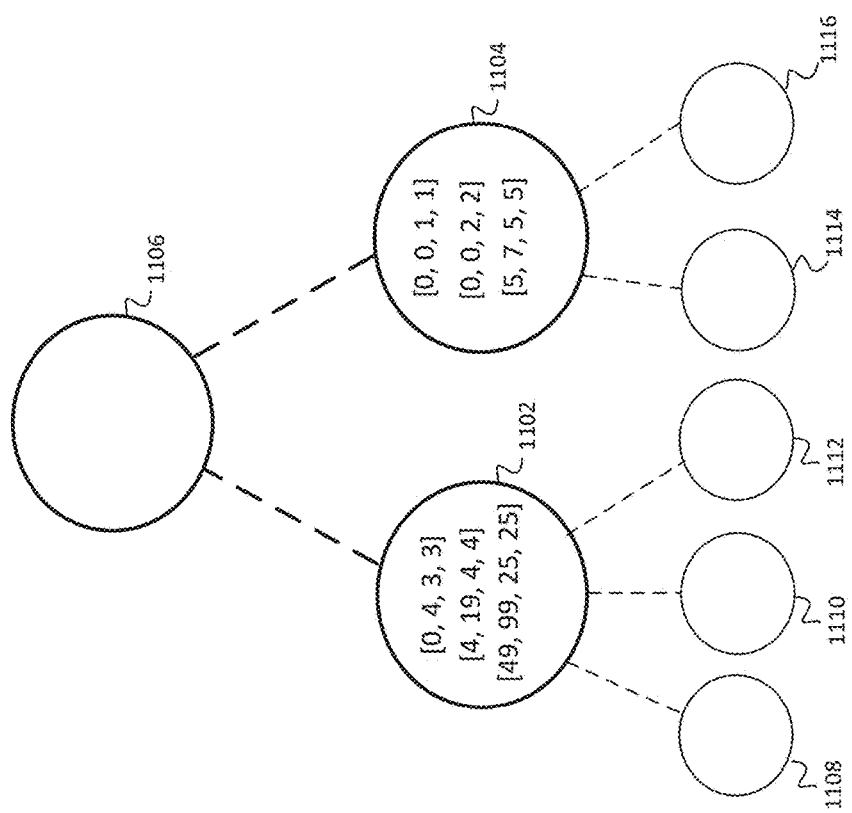

FIG. 11A and FIG. 11B depict example RTrees to help illustrate the technical improvements resulting from the use of columnar-based minimum bounding rectangles according to an embodiment.

Figure 11C:
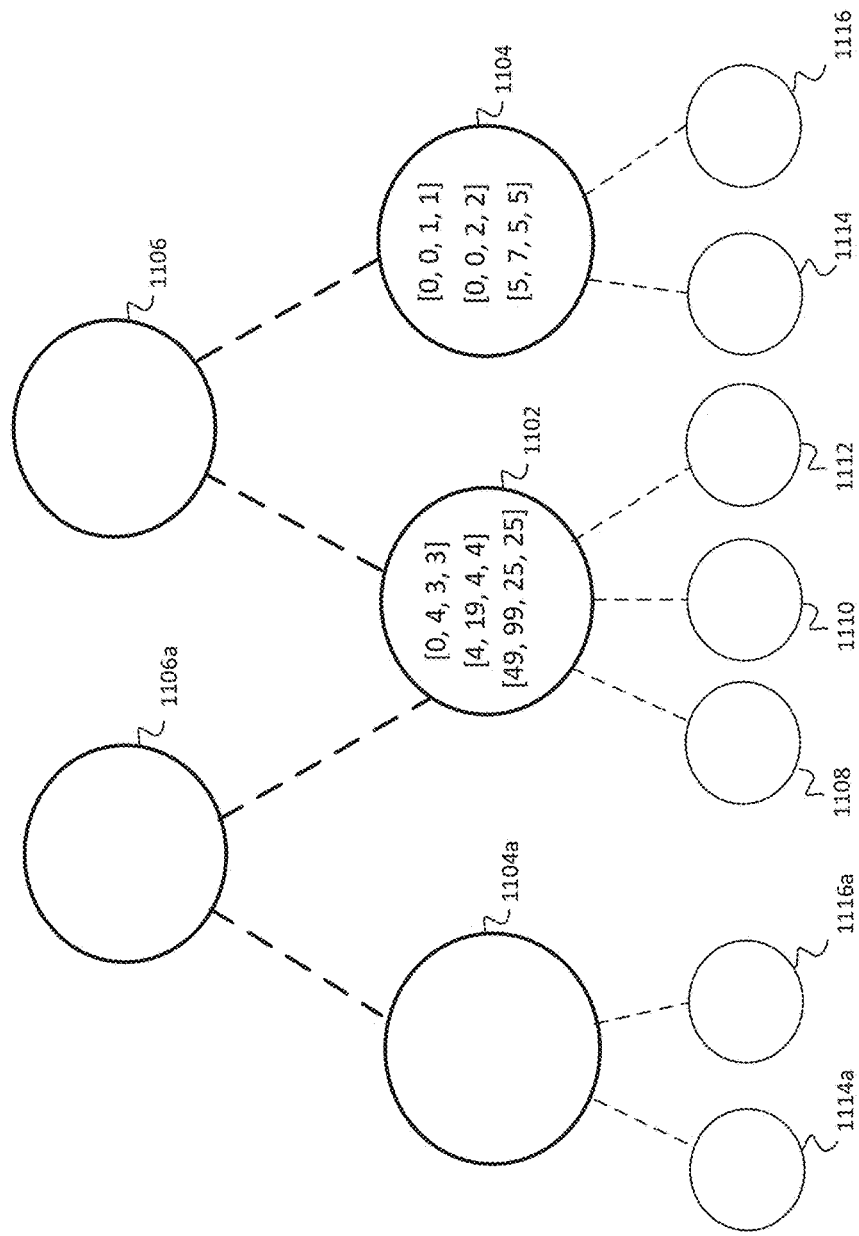

FIG. 11C illustrates the use of immutability in the context of the RTree of FIG. 11B according to an embodiment.

FIG. 12A, FIG. 12B, FIG. 12C, and FIG. 12D illustrate the use of virtual coordinates according to an embodiment.

FIG. 13A, FIG. 13B, FIG. 13C, and FIG. 13D depict changes to an example spreadsheet to accompany the example of FIGS. 12A-12D.

DESCRIPTION

Disclosed herein is a data storage and retrieval system for a computer memory. In an embodiment, the system includes a computing device that configures the computer memory according to an RTree (a type of logic tree) representing a structure of a spreadsheet. The computer memory may be internal to or external to the computing device. In an embodiment, the RTree has a plurality of nodes, at least some of which contain one or more minimum bounding rectangles. Each minimum bounding rectangle ("MBR") encompasses cells of the spreadsheet from a different one of a plurality of columns of the spreadsheet, but does not encompass cells of any of the other columns of the plurality of columns. A node of the RTree may hold multiple MBRs or a single MBR.

According to an embodiment, a method for maintaining coordinates of cells of a spreadsheet in a computer memory involves a computing device: receiving cells to be inserted into a spreadsheet (in which the cells are distributed across multiple columns of the spreadsheet), storing, in an RTree in the computer memory, data representing MBRs, each of which (1) encompasses cells from a different one of the columns, and (2) does not encompass cells of any of the other columns.

In an embodiment, the computing device receives a request for a search for a cell in the spreadsheet and, in response to the request, uses at least one of the MBRs to identify a node of the RTree to be searched. The computing device loads the identified node from an external computer memory into a computer memory that is internal to the computing device.

According to an embodiment, the external computer memory is accessible by a second computing device that executes a data store program, and the computing device requests the nodes from the second computing device via the data store program.

In an embodiment, the computing device receives a request for a search for a cell in the spreadsheet, recursively checks a subset of the nodes of the RTree to determine whether the cell is located within at least one of the MBRs, and loads, into a computer memory that is internal to the computing device, only those nodes of the RTree that contain an MBR within which the cell located or that contain a reference to the cell (e.g., a reference to a data structure in the external memory).

According to an embodiment, a data storage and retrieval system for a computer memory includes a computing device that configures the computer memory according to an RTree representing a structure of a spreadsheet and configures the RTree according to a map. At least some of the nodes of the RTree contain one or more MBRs, in which each minimum bounding rectangle encompasses coordinates of one or more cells of the spreadsheet. The nodes of the RTree may be ordered based on the ranges encompassed by the MBRs. The map includes (1) a mapping between a coordinate of a first row of the spreadsheet as displayed and coordinate of a first node of the RTree, and (2) a mapping between a coordinate of a second row as displayed and coordinate of a second node of the RTree. In response to a row being inserted between the first row and the second row of the spreadsheet as displayed, the computing device updates the map to include a mapping between the inserted row and a fractional coordinate that is between the coordinate of the first node and the coordinate of the second node. The RTree itself remains unchanged.

In an embodiment, the fractional coordinate is the lexical midpoint between the coordinate of the first row and the coordinate of the second row.

According to an embodiment, in response to a row of the spreadsheet being deleted, the computing device updates and re-inserts nodes with ranges containing start or stop rows corresponding to the deleted row.

The term "graph" as used herein refers to a representation of a set of objects, in which at least some pairs of objects in the set are connected to one another by one or more edges. Each of the objects occupies a vertex of the graph. An "interval-based dependency graph" or "dependency graph" as used herein is a data structure that represents the interdependencies of a set of formulas or other mechanisms of reference between objects by way of a graph, with the instantiation of each vertex being referred to as a "node." Possible implementations of a dependency graph include an interval tree and a skip list. The term "reference element" as used herein is an electronically-stored object (such as a formula, function) that establishes a unidirectional or bidirectional link between at least two objects (such as between at least two cells of a spreadsheet or at least two cells of different spreadsheets). An example of a reference element is a formula contained in a cell of a spreadsheet, wherein the formula refers to (relies upon) the value contained in some other cell of the spreadsheet (or a cell of a different spreadsheet or which, itself, may be the result of a formula calculation) in order to calculate a result. The term "table" as used herein is a collection of data organized into rows and columns. Examples of tables include a spreadsheet and a worksheet. A table may be embedded within any sort of document. Finally, "document" as used herein includes any type of electronically stored document, including text documents, spreadsheets, presentations, drawings, diagrams, and composite documents that include elements of different types of documents.

Figure 1:
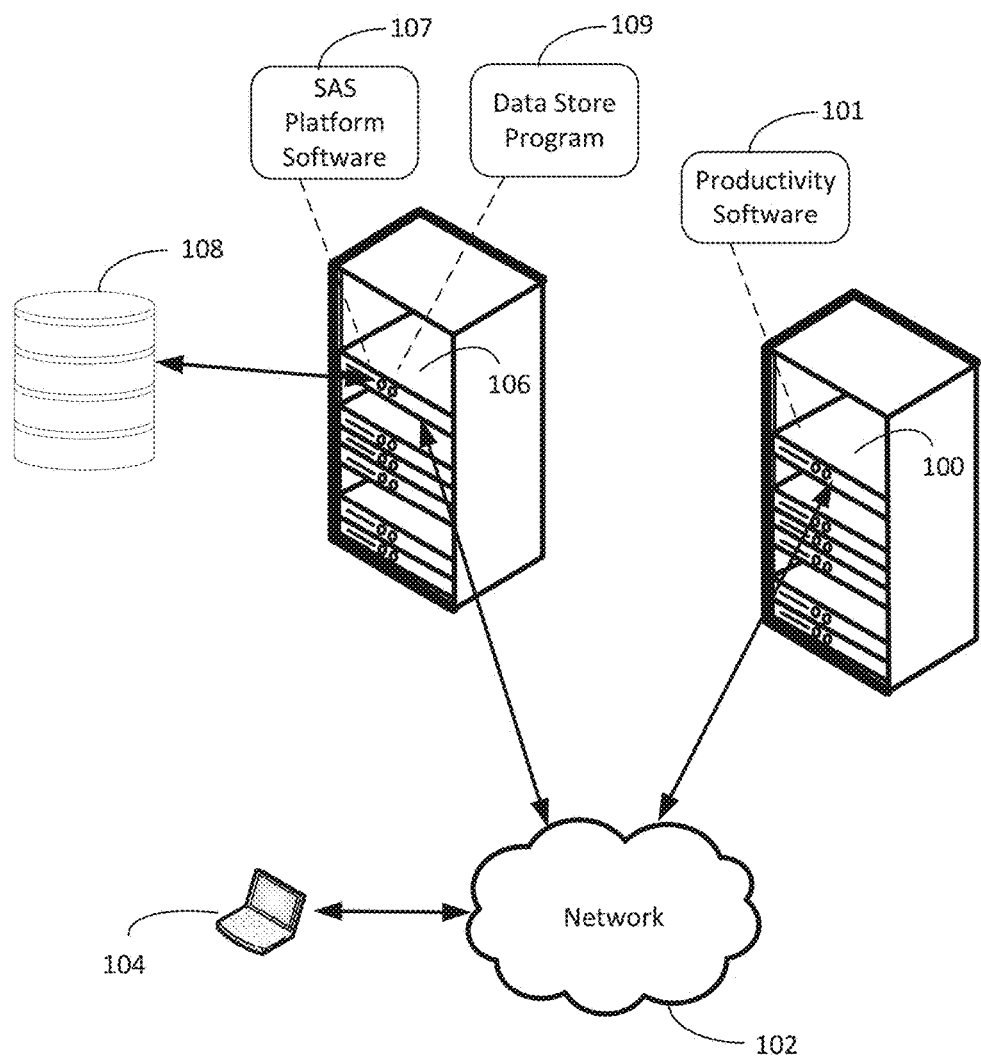
FIG. 1 is an example of a networking environment in which various embodiments of the disclosure may be employed.

Various embodiments of the disclosure are implemented in a computer networking environment. Turning to FIG. 1, an example of such an environment is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104 and a third computing device 106. It is to be understood that the various embodiments may be carried out on the first computing device 100, the second computing device 104, or other computing devices not depicted. In an embodiment, the second computing device 104 accesses the first computing device 100 via a thin, web-based client.

In an embodiment, the first computing device 100 executes productivity software 101 and the third computing device 106 executes software as a service ("SAS") platform software 107. In order to access various reference elements in an embodiment, the productivity software 101 transmits commands to the SAS platform 107 along one or more element identifiers ("IDs"). The SAS platform software 107 executes a data store program 109, which uses the one or more element IDs as indices to retrieve the one or more elements (including reference elements) from a graph database maintained in a media storage device 108. The data store program 109 also stores elements in the graph database using element IDs.

Figure 2A:
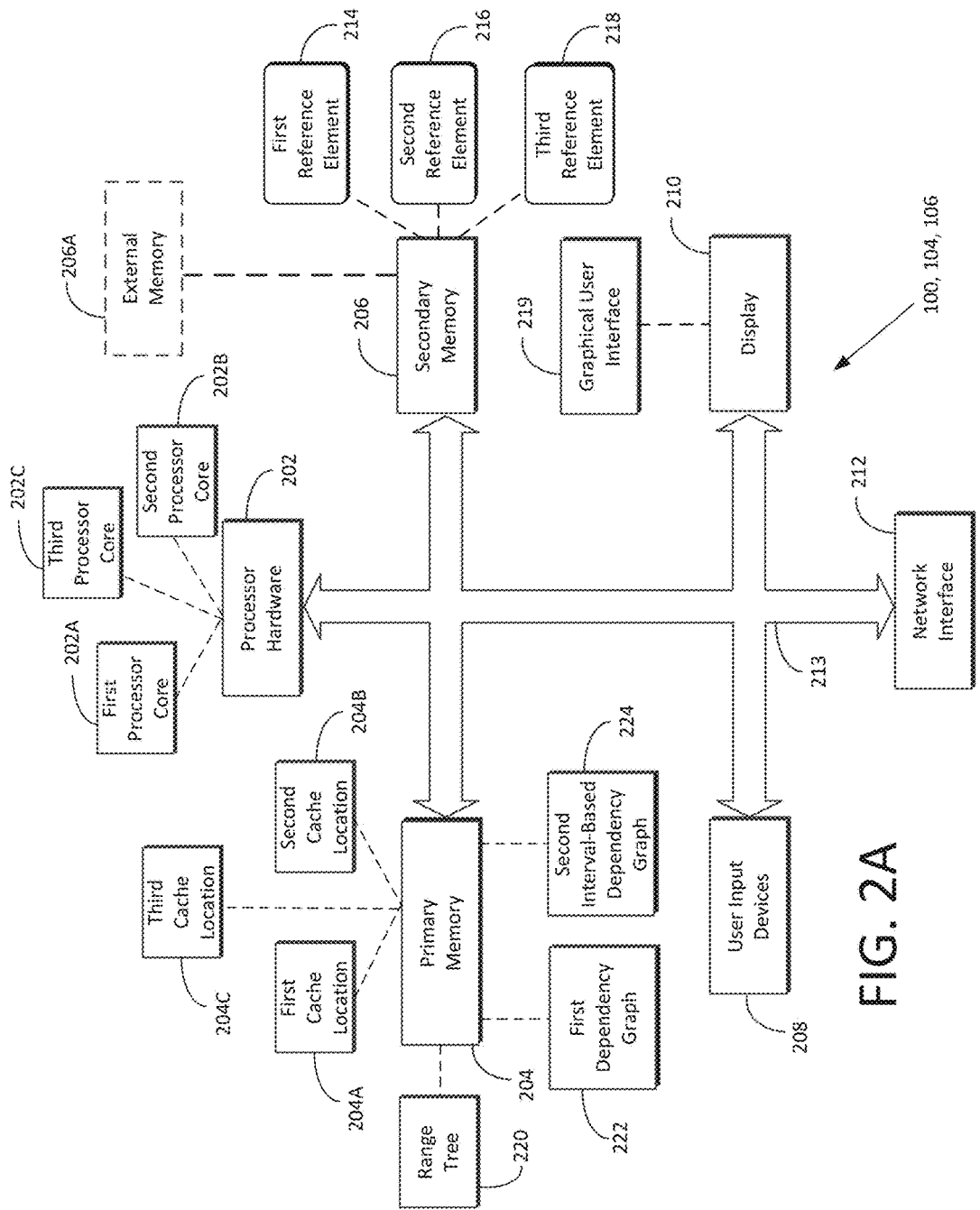
FIG. 2A is a block diagram of a computing device according to an embodiment.

In one implementation, one or more of the computing devices of FIG. 1 have the general architecture shown in FIG. 2A. The computing device according to this architecture includes processor hardware 202 (e.g., a microprocessor, controller, or application-specific integrated circuit) (hereinafter "processor 202"), a primary memory 204 (e.g., volatile memory, random-access memory), a secondary memory 206 (e.g., non-volatile memory), user input devices 208 (e.g., a keyboard, mouse, or touchscreen), a display device 210 (e.g., an organic, light-emitting diode display), and a network interface 212 (which may be wired or wireless (e.g., a network interface card). Each of the elements of FIG. 2A is communicatively linked to one or more other elements via one or more data pathways 213. Possible implementations of the data pathways 213 include wires, conductive pathways on a microchip, and wireless connections. In an embodiment, the processor 202 is one of multiple processors in the computing device, each of which is capable of executing a separate thread. In an embodiment, the processor 202 communicates with other processors external to the computing device in order to initiate the execution of different threads on those other processors. For example, the first computing device 100 could communicate with the third computing device 106 to initiate different threads of execution on one or more processors on the third computing device 106.

In some embodiments, the primary memory 204 includes multiple cache locations, represented in FIG. 2A by a first cache location 204A, a second cache location 204B, and a third cache location 204C. In an embodiment, the processor 202 includes multiple processor cores, represented in FIG. 2A by a first processor core 202A, a second processor core 202B, and a third processor core 202C. Each processor core is capable of operating independently of the other processor cores, and is capable of carrying out a separate thread of execution (e.g., by retrieving instructions and data from the primary memory 204). Thus, two or more of the processor cores can execute threads in parallel and independently.

The memories 204 and 206 store instructions and data. In some embodiments, the secondary memory 206 is implemented as, or supplemented by an external memory 206A. The media storage device 108 is a possible implementation of the external memory 206A. The processor 202 executes the instructions and uses the data to carry out various procedures including, in some embodiments, the methods described herein, including displaying a graphical user interface 219. The graphical user interface 219 is, according to one embodiment, software that the processor 202 executes to display a spreadsheet on the display device 210, and which permits a user (e.g., operating the second computing device 104) to make inputs into the various cells of the spreadsheet via the user input devices 208.

Stored within the secondary memory 206 (or the external memory 206A) are one or more reference elements, represented in FIG. 2A by a first reference element 214, a second reference element 216, and a third reference element 218. Each reference element includes one or more data structures including: (1) an abstract syntax tree ("AST") having information regarding how the reference element (e.g., the spreadsheet cell formula) is to be interpreted and (2) a data structure (such as a bit array) representing the location or locations (e.g., the spreadsheet cell locations) of data on which the reference element depends. Each reference element can be referenced by its own, unique element ID. One possible implementation of an element ID is a Globally Unique Identifier ("GUID"). According to an embodiment, each reference element is a data structure that corresponds to a cell in a spreadsheet. If the cell contains a formula, then the reference element includes a pointer to an AST for the formula.

In an embodiment, the processor 202 maintains a range tree 220 in the primary memory 204. Each node of the range tree 220 is associated with one or more reference elements. In one implementation, each node of the range tree 220 represents a cell of a spreadsheet that contains a formula. As will be discussed below in further detail, the processor 202 may, for a given formula of the spreadsheet, search the range tree 220 to identify which cells contain formulas. The range tree 220 may be one of multiple range trees. According to various embodiments, the processor 202 also maintains a first dependency graph 222 and a second dependency graph 224, each of which is interval-based, and each of whose functionality will be described below in further detail. In some embodiments, the processor 202 only maintains a single dependency graph. In others, the processor 202 maintains more than two dependency graphs.

In an embodiment, the processor 202 retrieves multiple pieces of data from its own memory (one or both of its primary memory and its secondary memory) or from an external data storage device (e.g., from the media storage device 108 via request sent to the third computing device 106) to assemble a spreadsheet.

Figure 2B:
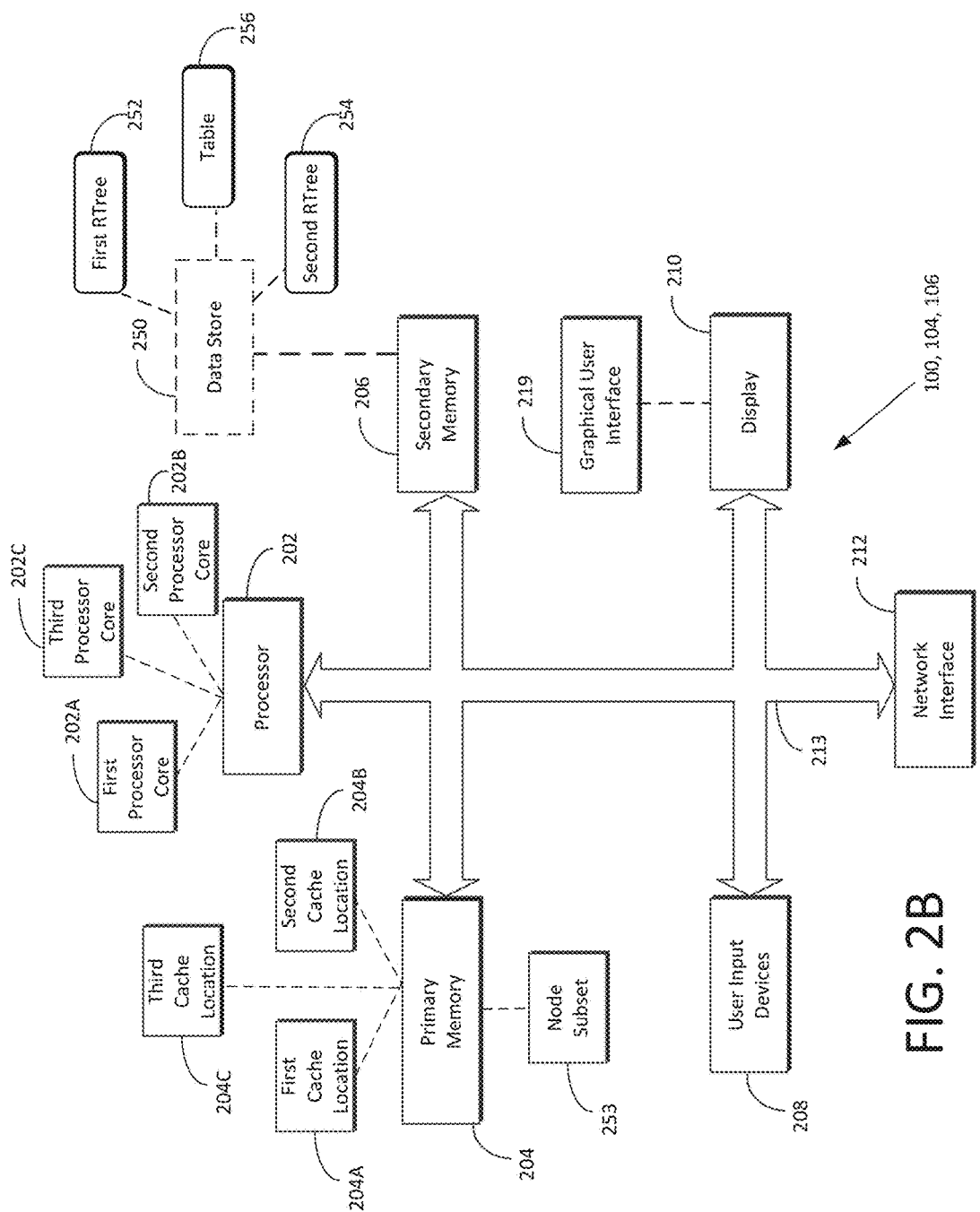
FIG. 2B is a block diagram of a computing device according to another embodiment.

Turning to FIG. 2B, according to an embodiment, instead of using a range tree and two dependency graphs, a computing device uses two RTrees (e.g., Hilbert RTrees)—one RTree in place of the range tree and one RTree in place of the two dependency graphs—which are primarily persisted in an electronic data store ("data store") 250, which is maintained in memory that is external to the computing device (e.g., maintained in the media storage device 108 by the data store program 109). In an embodiment, the data store 250 is a graph database. The processor 202 in this embodiment uses a first RTree 252 to search for cells (e.g., search for cells containing formulas) and uses a second RTree 254 to search for dependencies (e.g., search for cells on which formulas depend). In this embodiment, the processor 202 does not necessarily need to load an entire RTree into the primary memory 204 in order to search it, but instead loads only those nodes (shown as node subset 253 in FIG. 2B) that it needs to search in order to find cells. Also persisted in the data store 250 is the table itself, represented by block 256 in FIG. 2B. The table 256 is, in one implementation, composed of multiple nodes within the data store 250 (e.g., one node per cell with the nodes being implemented as vertices of a graph database). As previously noted, one example of a table is a spreadsheet.

In each of the RTrees, each non-leaf node contains an MBR (i.e., contains data representing an MBR). An MBR in this context is the smallest possible rectangle that encompasses all of the cells that the portion of the RTree under that node references. An MBR can be as small as a single cell (which has a start row equal to the end row, and a start column equal to the end column). Each leaf node of the RTree contains a reference (e.g., element ID number or uniform resource identifier ("URI")) to a cell of a table (e.g., a cell of a spreadsheet) and an indicator of the cell's position within the table. In one implementation, the data representing the MBR is in the form of numbers describing the start row, end row, start column, and end column of the MBR with respect to the table. The notation [start row, end row, start column, end column] will often be used herein to express the MBR, with Row 1 being represented by '0' and Column A being represented by '0.'

In an embodiment, for each of the RTrees 252 and 254, each node of the RTree is serialized into binary, given a key, and persisted in the data store 250. To search a given RTree, the processor 202 retrieves its root node (e.g., copies it from the data store 250 into the primary memory 204) and queries the root node to determine whether the cell or cells it is looking for are within the MBR of the any of the children of the root node. If yes, then the processor 202 obtains the relevant child node or nodes from the data store 250 (e.g., copying it or them into the primary memory 204) and, for each child obtained, makes the same query. The processor 202 repeats this process recursively until it reaches one or more leaf nodes. When the processor 202 reaches the point at which it is loading leaf nodes into the primary memory 204, it starts reviewing the cell position data contained in the leaf node or nodes in order to locate a match. If it finds one or more matches, the processor 202 copies the cells (e.g., requests them from the data store 250) and stores them into the primary memory 204.

According to an embodiment, the processor 202 adds nodes to the RTrees 252 as data is entered into one or more cells of the table 256. For example, if a user has an active spreadsheet open and imports multiple columns from another spreadsheet, the processor may add a node representing those additional columns.

Figure 3:
FIG. 3 shows a spreadsheet that helps illustrate an embodiment.

In order to illustrate principles of the various embodiments, an example of a spreadsheet is shown in FIG. 3. The spreadsheet, generally labeled 300, has a number of cells that are organized into rows and columns. The spreadsheet 300 would ordinarily not display the formulas within the cells, but instead would display the evaluated result of the formulas with the cells and the formulas above within a formula bar. However, for ease of reference, the formulas are shown in FIG. 3 inside the respective cells they govern. Each cell has an element ID that the processor 202 may use to retrieve the contents of the cell, including the formula of the cell (if it has a formula) and the value contained in the cell (either a constant or the calculated result of a formula). Although the only type of formula shown in FIG. 3 is a "sum" formula, it is to be understood that other types of formulas are possible. Additionally, a cell might contain a link to another cell, and such a link could be treated the same way as a formula for the techniques described herein.

According to an embodiment, for each cell in FIG. 3, the processor 202 uses a numerical value to represent the row (starting with zero, so that row one is represented by the value zero, row two is represented by the value one, row three is represented by the value two, etc.) and a numerical value to represent the column (starting with zero, where column A is represented by the value zero, column B is represented by the value one, column C is represented by the value two, etc.). The processor 202 represents each interval as a starting point (inclusive) followed by an ending point (exclusive). For example, processor 202 represents a column interval from column A to column A by the interval [0,1). In an embodiment, the processor 202 uses these numerical values to calculate the size of the interval as the difference between the ending point to the starting point. For example, the size of the column interval from column A to column A is 1−0=1. For the sake of clarity, however, the intervals of rows and columns will hereafter be described in terms of rows and column notations of FIG. 3 with inclusive endpoints. Thus, for example, the range of cells from A6 to C6 will be said to include the row interval [6,6] and the column interval [A,C].

In an embodiment, when the computing device (e.g., the first computing device 100) receives the input of a formula into a spreadsheet (e.g., from the second computing device 104 via the network 102), the processor 202 analyzes the AST of the formula to determine which cells the formula references, populates the data structure (e.g., a bit array) with data representing those cells, and associates the cell into which the formula has been input with the appropriate nodes of the dependency graphs 222 and 224 (or the second RTree 254). Furthermore, the processor 202 inserts a node into the range tree 220 (or the first RTree 252) corresponding to the cell location (e.g., A6) into which the formula is input. Additionally, the processor 202 analyzes the range tree 220 and the dependency graphs 222 and 224 (or first and second RTrees 252 and 254, if they are being used) in order to determine which formulas of the spreadsheet may be carried out in parallel, assign the newly-input formula to a group based on this analysis, and update any previously-assigned groups of other, previously-input formulas based on the analysis. According to various embodiments, the processor 202 carries out these operations in such a way and with such timing that they are complete by the time an event requiring recalculation of the spreadsheet is required (e.g., immediately upon input of the formula).

Figure 4:
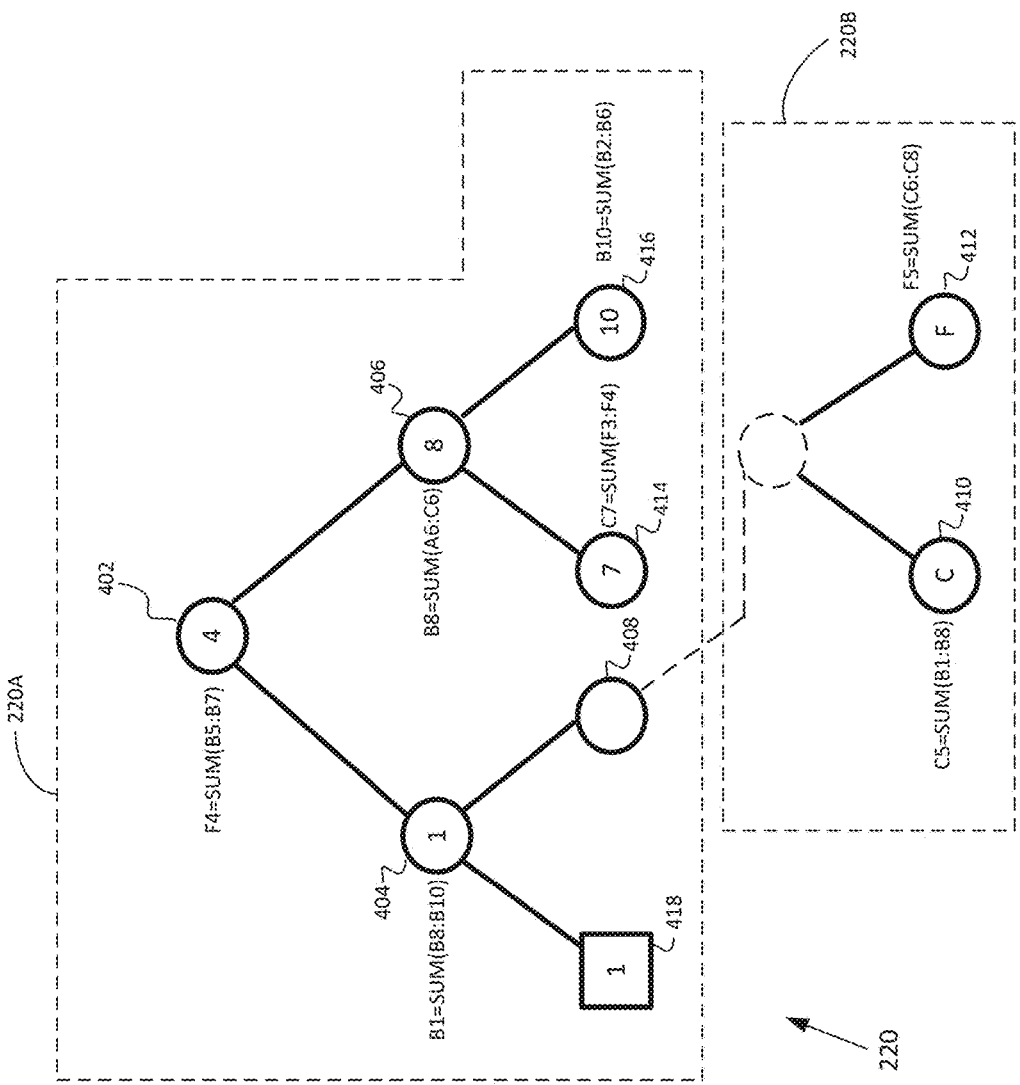
FIG. 4 shows a range tree according to an embodiment.

Turning to FIG. 4, a possible implementation of the range tree 220 for the spreadsheet of FIG. 3 is shown. The range tree 220 in this example is a two-dimensional range tree, with a first dimension (region 220A) representing the rows of the spreadsheet 300, and a second dimension (region 220B) representing the columns. The rows and columns are denoted in FIG. 4 by their actual row and column values in FIG. 3 for ease of reference. In other implementations, however, the rows and columns would both be numerically represented and start from zero. Associated with each node of the range tree 220 is a cell of the spreadsheet 300 (whose location and formula are textually shown within the node in FIG. 4 for convenient reference). In some embodiments, an object containing serialized data for the cell (e.g., the value in the cell, and a pointer to the root node of an AST, if the cell contains a formula, or a null pointer, if the cell does not contain a formula) is part of the node. The range tree in this implementation only includes nodes corresponding to those cells in the spreadsheet 300 containing formulas. In some embodiments, however, the range tree 220 would include a node for each cell having a value in it, and the processor 202 would distinguish between nodes representing formula-containing cells and nodes representing non-formula-containing cells by reading the AST pointer of the cell object. Additionally, the processor 202 could treat linking references the same way it treats formulas. For example, if a cell merely contained a link to some other cell (e.g., cell B9 might contain a link to cell B10, such that cell B9's value was always the same as that of cell B10), the processor 202 could include such a cell in any search of the range tree 220.

The nodes of the range tree 220 are connected with one another by edges as shown in FIG. 4. For example, in the first region 220A of the range tree 220: a first node 402 represents cell F4; a second node 404 represents cell B1; a third node 406 represents cell B8; a fourth node 408 refers to a second region 220B (in a second dimension) having a fifth node 410 representing cell C5 and a sixth node 412 representing cell F5; a seventh node 414 represents cell C7; and an eighth node 416 represents cell B10. The first region 220A also includes a duplicate node 418 for the purpose of balancing the tree. Naturally, the processor 202 may create and maintain more complex two-dimensional structures for other spreadsheets. For the sake of clarity, only the fourth node 408 is depicted as having a second dimension.

Figure 5A:
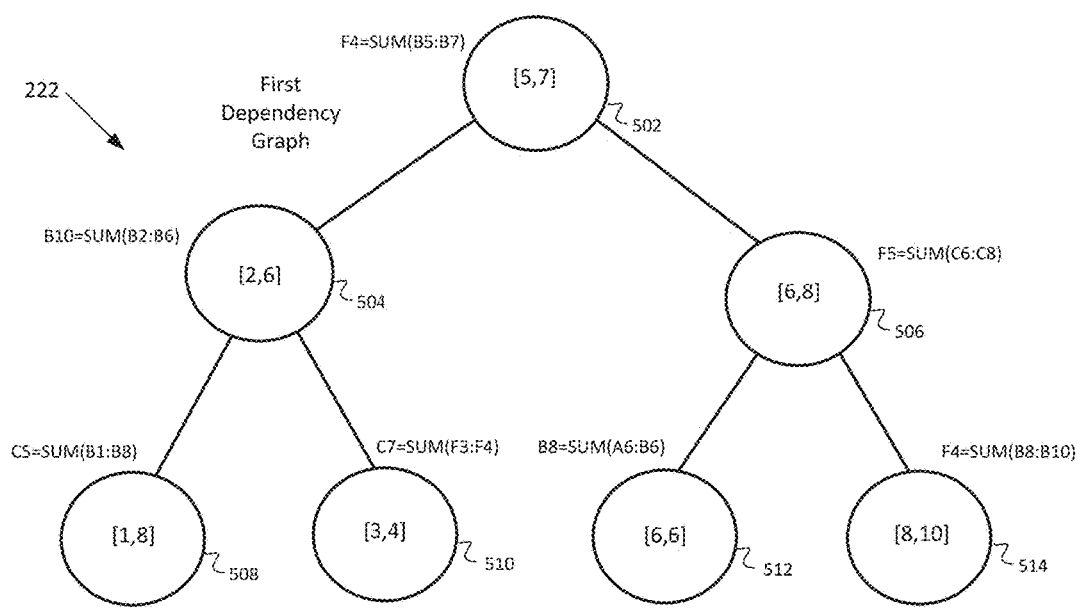
FIG. 5A shows a first dependency graph according to an embodiment.
Figure 5B:
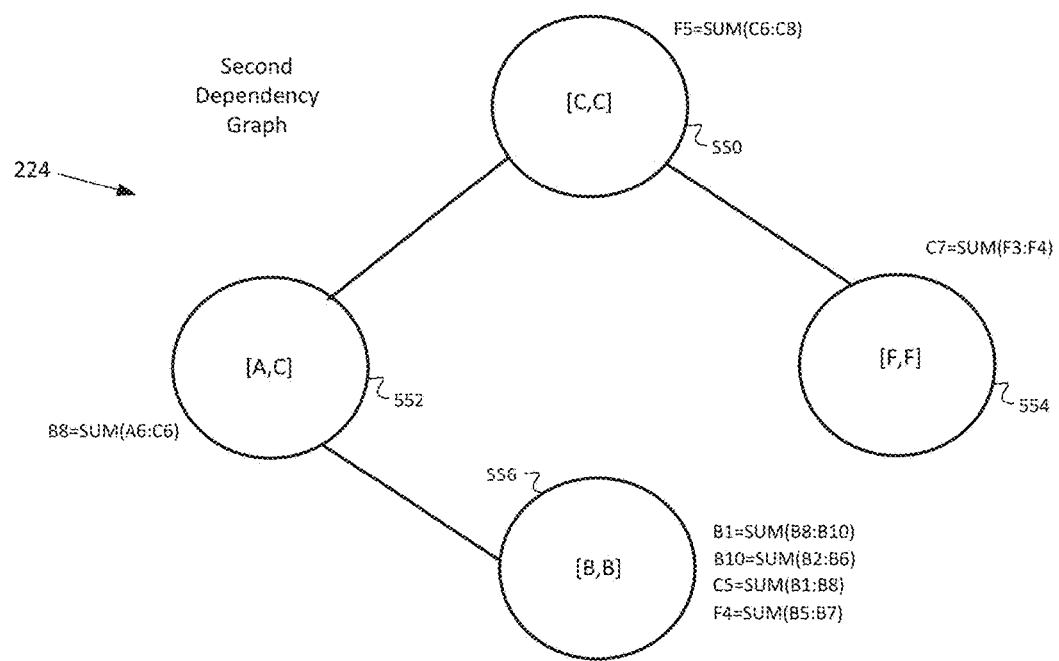
FIG. 5B shows a second dependency graph according to an embodiment.

Turning to FIG. 5A and FIG. 5B, possible implementations of the first dependency graph 222 and the second dependency graph 224 for the spreadsheet of FIG. 3 are shown. The first dependency graph 222 (FIG. 5A) in this example is a row interval tree, and the second dependency graph 224 (FIG. 5B) is a column interval tree. As with FIG. 4, the rows and columns of FIG. 5A and FIG. 5B are denoted by their actual row and column values (from FIG. 3) for ease of reference. In other implementations, however, the rows and columns would both be numerically represented and start from zero. Associated with each node of the first dependency graph 222 and the second dependency graph 224 is at least one cell of the spreadsheet 300 (whose location and formula are textually shown within the node for convenient reference) that depends on at least one cell that falls within the range of rows or columns represented by the node. This may include, for example, a dependency based on a formula or a dependency based on a link.

Continuing with FIG. 5A, the processor 202 creates and maintains the first dependency graph 222 to track the rows on which each of the formulas of the spreadsheet 300 depends. The first dependency graph 222 in this example includes: a first node 502 representing the interval of row five to row seven and associated with cell F4; a second node 504 representing the interval of row two to row six and associated with cell B10; a third node 506 representing the interval of row six to row eight and associated with cell F5; a fourth node 508 representing the interval of row one to row eight and associated with cell C5; a fifth node 510 representing the interval of row three to row four and associated with cell C7; a sixth node 512 representing row six only and associated with cell B8; and a seventh node 514 representing the interval of row eight to row ten and associated with cell F4.

Turning to FIG. 5B, the processor 202 creates and maintains the second dependency graph 224 to track the columns on which each of the formulas of the spreadsheet 300 depends. The second dependency graph 224 in this example includes: a first node 550 representing column C only and associated with cell F5; a second node 552 representing the interval of column A to column C and associated with cell B8; a third node 554 representing column F only and associated with cell C7; and a fourth node 556 representing column B only and associated with cells B1, B10, C5, and F4.

For ease of reference, Table 1 maps the cells of FIG. 3 (via their respective formulas) to their row intervals in the first dependency graph 222 ("Depends on Row Interval"), their column intervals in the second dependency graph 224 ("Depends on Column Interval"), the identity of cells that would be returned in a search of the range tree 220 ("Depended on By"), and the respective calculation groups of the formulas, which will be described below in more detail ("Group"). The notation "=SUM(X:Y)" means "sum the values from cell X to cell Y, inclusive."

TABLE 1

| Cell | Formula | Depends on Row Interval | Depends on Column Interval | Depended on By | Group |
|------|---------|-------------------------|----------------------------|----------------|-------|
| B10 | =SUM(B2:B6) | [2, 6] | [B, B] | B1, C5 | 0 |
| F4  | =SUM(B5:B7) | [5, 7] | [B, B] | C7, F5 | 0 |
| B8  | =SUM(A6:C6) | [6, 6] | [A, C] | B1, C5 | 0 |
| C7  | =SUM(F3:F4) | [3, 4] | [F, F] | F5 | 1 |
| B1  | =SUM(B8:B10) | [8, 10] | [B, B] | C5 | 1 |
| C5  | =SUM(B1:B8) | [1, 8] | [B, B] | — | 2 |
| F5  | =SUM(C6:C8) | [6, 8] | [C, C] | — | 2 |

In an embodiment, when the processor 202 detects that a cell of a spreadsheet has been edited, the processor 202 searches the dependency graphs 222 and 224 (or the second RTree 254) to identify all formulas in the spreadsheet that are interested in (i.e., depend on) that cell, and executes these formulas group by group, with formulas in each group being executed in parallel with one another.

Figure 6A:
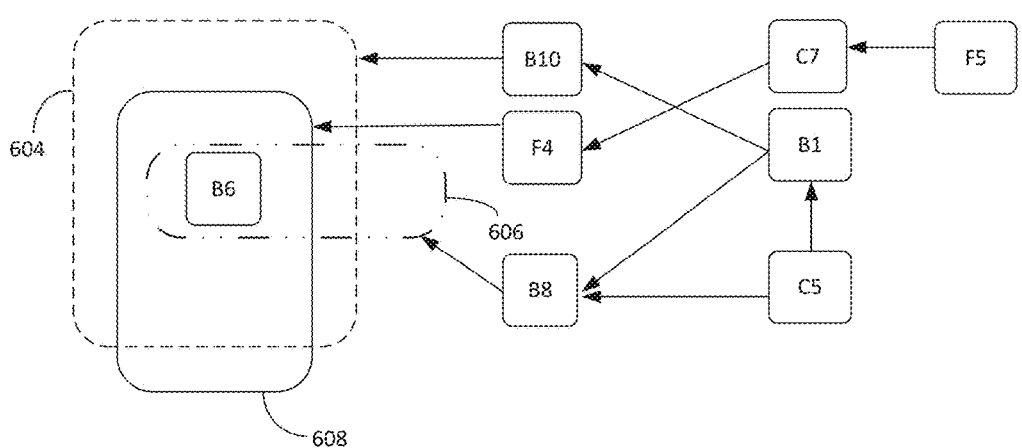
FIG. 6A and FIG. 6C depict the dependencies among formulas of a spreadsheet according to different embodiments.
Figure 6B:
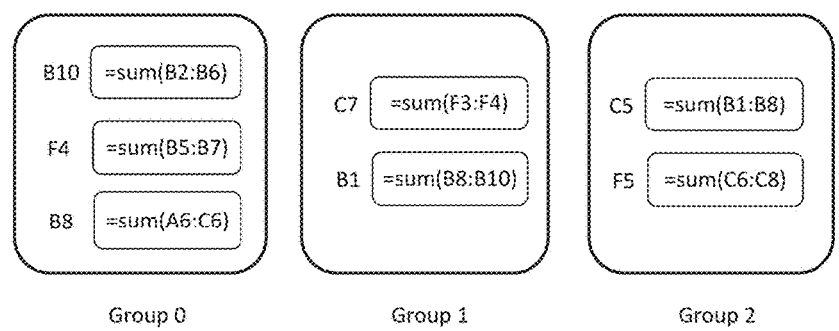
FIG. 6B and FIG. 6D depict the grouping of the formulas of a spreadsheet into groups for parallel processing according to different embodiments.

Turning to FIG. 6A, a representation of the interdependencies among the formulas of the spreadsheet 300 is depicted. For the sake of example, this representation assumes that the value in cell B6 is changed (e.g., from '4' to '5'). The range of cells on which the formula of cell B10 depends is represented by a box 604, the range of cells on which the formula of cell B8 depends is represented by a box 606, and the range of cells on which the formula of F4 depends is represented by a box 608. In an embodiment, the processor 202 groups the formulas according to their dependencies as shown in FIG. 6B, and recalculates the formulas (based on the new value) in each group in parallel using multiple processors and multiple processor cores in order to optimize the speed of the recalculation.

Figure 7:
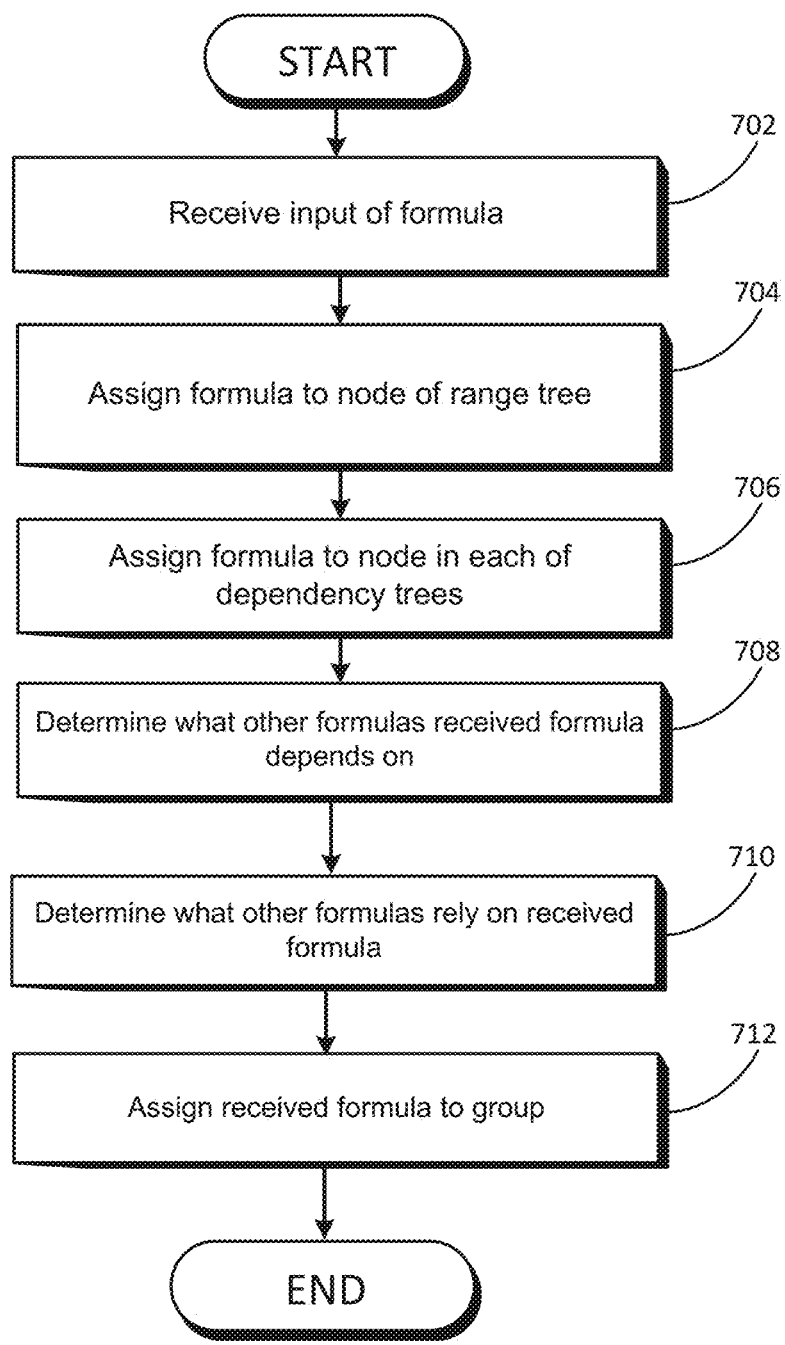
FIG. 7 shows an example of how a computing device maintains dependencies among reference elements in an embodiment.

Turning to FIG. 7, an example of how a computing device maintains dependencies among reference elements in an embodiment is described. In this example, it will be assumed that the processor 202 is carrying out the actions on the first computing device 100 and that the reference elements are formulas of a spreadsheet. It is to be understood that, although the actions are depicted as occurring in sequence, many of them may be performed in parallel. At block 702, the processor 202 receives an input of a formula into the spreadsheet. For example, assume that the first computing device 100 hosts the spreadsheet 300 by executing the productivity software 101 on the processor 202, and that the second computing device 104 executes a web browser that interacts with the productivity software 101 to display the spreadsheet 300. Further assume that a user interacts with the second computing device 104 to input the formula "=SUM(B2:B6)" into cell B10 of the spreadsheet 300. The second computing device 104 transmits the input formula to the first computing device 100 via the network 102. The processor 202 (assumed to be part of the first computing device 100 in this example) receives the input formula and creates an AST for the formula.

At block 704, the processor 202 assigns the received formula to a node (creating the node if necessary) in the range tree 220 (or the first RTree 252). For example, the processor 202 may assign the formula to a node based on the location (row and column) of the cell within the spreadsheet 300.

At block 706, the processor 202 assigns the received formula to a node (again, creating the node, if necessary) in each of the dependency graphs 222 and 224 (or to a node in the second RTree 254).

At block 708, the processor 202 determines what other cells with formulas the received formula depends upon. For example, the processor 202 analyzes the AST of the received formula to determine which cell intervals the received formula depends upon and then queries the range tree 220 (or first RTree 252) to determine which, if any, of those depended-upon cells contain formulas.

At block 710, the processor 202 determines (e.g., by querying the dependency graph 222 and 224 or by querying the second RTree 254) what other formulas rely upon the received formula.

At block 712, the processor 202 assigns the formula to a group based on the determinations it made at block 708 and, if necessary, block 710. In assigning the formula to a group, the processor 202 selects the first group in which the received formula can be safely calculated after dependencies on other formulas have been resolved. For example, assume that the spreadsheet 300 is in an initial, blank state (i.e., there are no other formulas in the spreadsheet), so the processor 202 receives a result of "zero hits" back from the query to the range tree 220 (or to the first RTree 252). The processor 202 determines, based on the result, that the received formula is not dependent on any other formulas. The processor 202 therefore assigns the formula to the first group ("Group 0"), as shown in FIG. 6B.

To illustrate how a formula might be moved from one group to another, assume that, after inputting the formula in B10, the user inputs the formula of C5, which is "=SUM (B1:B8)." The processor 202 queries the range tree 220 (or first RTree 252) at block 708 and receives one hit back from the range tree 220—that of the cell B10. The processor 202 determines the group to which the formula of cell B10 was assigned—Group 0 in this case—and assigns the formula of C5 to the next available group—the second group ("Group 1"). The processor 202 also queries the first and second dependency graphs 222 and 224 (or the second RTree 254) and determines that there are no formulas in the spreadsheet 300 that depend on it (i.e., depend on C5). Further assume that the user subsequently inputs still another formula into the spreadsheet 300—the formula of B1, which is "=SUM (B8:B10)."The processor 202 carries out block 708 and, as a result of the query of the range tree 220 (or first RTree 252), receives a result of B10. The processor 202 also carries out block 710 for the formula of B1 and determines, based on the query of the dependency graphs 222 and 224 (or second RTree 254), that the formula of C5 is dependent on B1. Consequently, the processor 202 assigns the formula of B1 to the next available group after B10's group—Group 1—and reassigns the formula of C5 to the next available group after B1's group, which is Group 2. In other words, the processor 202 identifies the dependency of C5 on B1 and, because B1 needs to be calculated before C5, bumps C5 from Group 1 and into the next group.

In an embodiment, a computing device uses a range tree and a dependency graph (e.g., such as the range trees and dependency graphs discussed herein) or uses RTrees to identify dependencies among multiple reference elements (e.g., to identify what depends on each reference element and to identify what each reference element depends on) by carrying out a flattening process on the dependency graph. Additionally, the computing device can use this process to identify those reference elements that are circular. A reference element is "circular" if it refers to at least one other reference element that refers back to it. An example of a circular reference element would be if cell A1 had the formula "=A2+3" and cell A2 had the formula "A1−3." The formula in A1 and the formula in A2 would each be considered a circular reference element. A circular reference may be many levels deep.

Figure 6C:
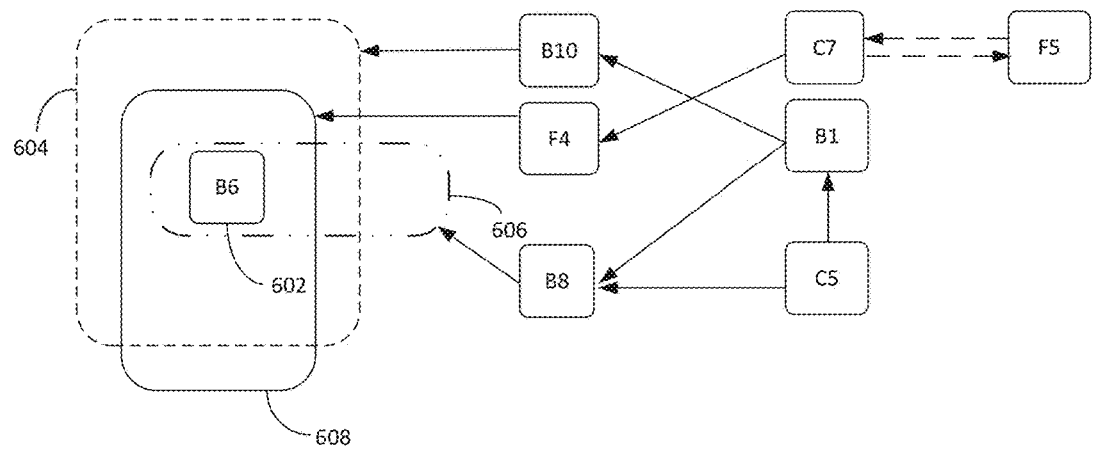
Figure 6D:
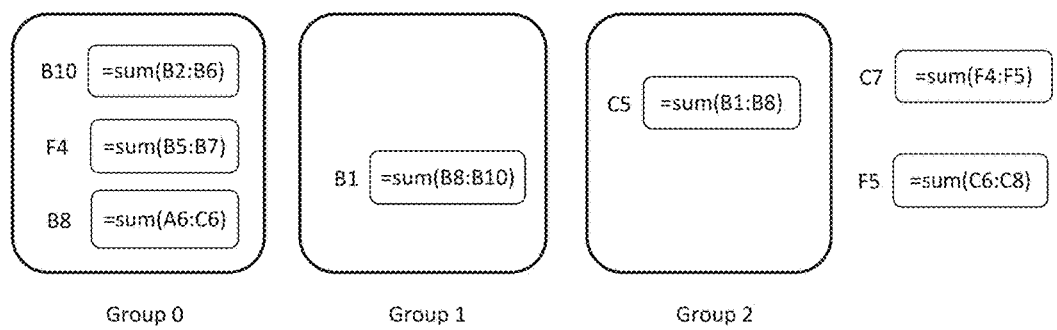

For example, the processor 202 would, for a given formula of the spreadsheet 300, carry out the operation of assigning the formulas to groups as described above, and iterate through the dependency graphs 222 and 224 (or through the second RTree 254) until it reached an iteration where it could not flatten any more formulas, i.e., it has traversed the entire dependency graph originating with the input initiating this process. At that point, the processor 202 designates as circular those formulas that have not been assigned to a group. Some formulas designated as circular might not be directly circular, but may just depend on circular formulas. To illustrate an embodiment having circular reference, the diagrams of FIG. 6C and FIG. 6D use the formulas of the spreadsheet 300 but with one change: the formula for C7 is "=SUM(F4:F5)" instead of "=SUM(F3: F4)." Consequently, if the processor 202 carries out the grouping operation described above, then the formulas for cells C7 and F5 would be separated out into a separate circularity group of their own for processing. In some cases, processing these formulas would involve displaying an error message on the user interface 219.

Figure 8:
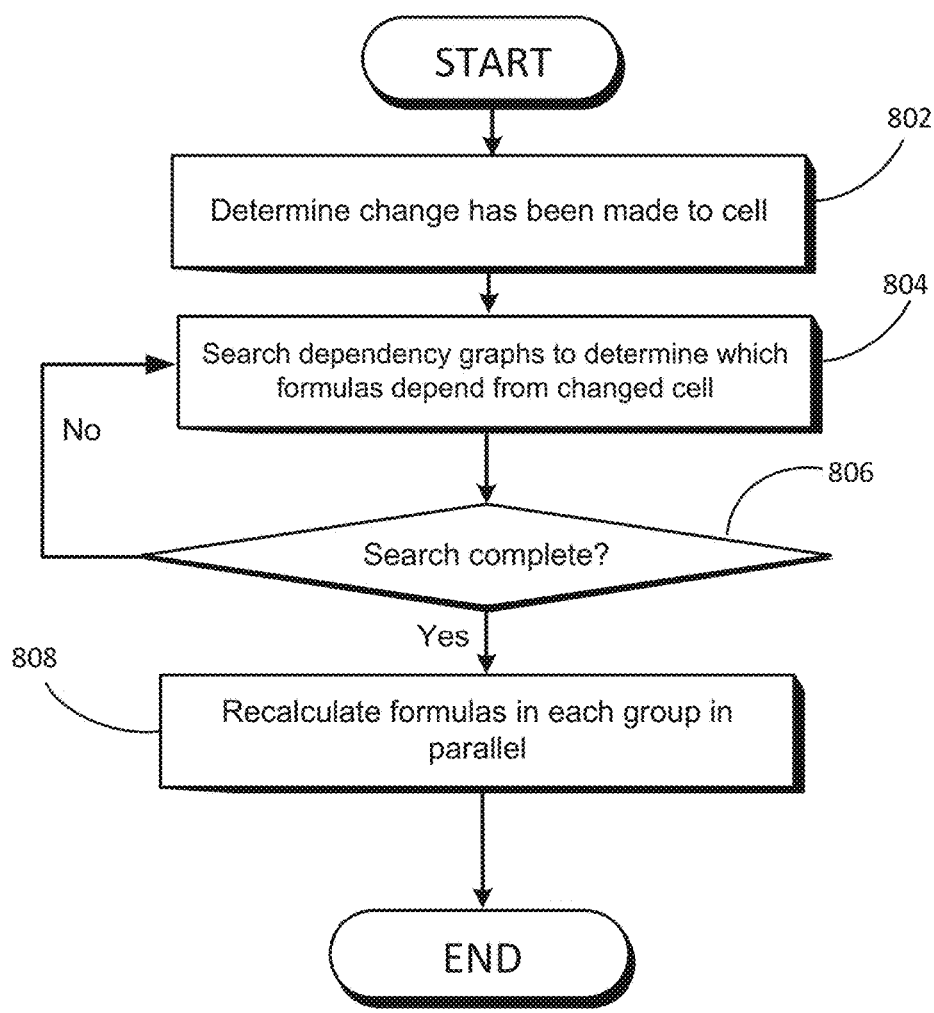
FIG. 8 shows an example of how a computing device reevaluates reference elements in an embodiment.

Turning to FIG. 8, an example of how a computing device reevaluates reference elements in an embodiment is described. As with the previous example, it will be assumed that the processor 202 is carrying out the actions on the first computing device 100 and that the reference elements are formulas of a spreadsheet. Furthermore, the actions represented in FIG. 8 do not necessarily have to be carried out in the sequence shown and may, as appropriate, be carried out in parallel. At block 802, the processor 202 determines that a change has been made to a cell of the spreadsheet. For example, assume that the first computing device 100 hosts the spreadsheet 300 by executing the productivity software 101 on the processor 202, and that the second computing device 104 executes a web browser that interacts with the productivity software 101 to display the spreadsheet 300. Further assume that a user interacts with the second computing device 104 (via the graphical user interface 219) to change the value of cell B6 from '4' to '5,' which the processor 202 detects. The second computing device 104 transmits the changed value to the first computing device 100 via the network 102.

At block 804, the processor 202 searches the dependency graphs 222 and 224 (or searches the second RTree 254) to determine which formulas depend on the changed cell. In this example, the processor 202 determines, based on the search, that the formulas of cells B10, F4, and B8 reference cell B6. The processor 202 continues to search the dependency graphs 222 and 224 (or the second RTree 254) to identify the formulas that reference B10, F4, and B8, the formulas that reference those formulas, and so on, until the processor 202 completes its search (block 806). As a result, the processor 202 identifies the formula of the cells shown in FIG. 6B. However, the processor 202 does not need to determine the order in which to recalculate these formulas because the processor 202 already made this determination during the process set forth in conjunction with FIG. 7. That is, each of the formulas located by the processor 202 in carrying out blocks 804 and 806 have already been assigned to groups, and this group assignment is reflected in the data associated with the nodes of the dependency graphs 222 and 224 (or the second RTree 254) with which the respective formulas are associated.

At block 808, once the processor 202 has completed identifying a group of formulas (and, for example, moves on to identifying the next group), the processor 202 (in parallel with searching the dependency graphs 222 and 224 or the second RTree 254) calculates the formulas of the group based on the new value in the changed cell. Because the formulas in a particular group do not depend on one another, the computing device 200 can calculate each of these formulas in parallel with one another. In one embodiment, for each formula calculation completed, the processor 202 stores the result in memory (e.g., cache memory) so that the formula or formulas of the next group that depend from the first formula can access the result. For example, the first processor core 202A recalculates the result of the formula of B10 and stores the result in the first cache location 204A, while, in parallel, a second processor core 202B recalculates the result of the formula of F4 and stores the result in the third cache 204B, and the third processor core 202C recalculates the result of the formula of B8 and stores the result in the third cache 204C. Once recalculation of the formulas of Group 0 have been completed, any available processor core can access the appropriate result from the appropriate cache and begin recalculating the formulas of Group 1, and so on.

In an embodiment, the processor 202 caches the results of frequently-used operations in order to optimize the speed at which it recalculates the formulas of a spreadsheet. For example, assume that the processor 202 is executing a spreadsheet that has cells B1=SUM(A1:A100) and C1=SUM(A1:A100)+SUM(B1:B100). The processor 202 needs to calculate B1 before C1, but B1 and C1 do share a common operation: SUM(A1:A100). When the processor 202 calculates B1, it may cache the result in one of the cache locations of FIG. 2 When the processor 202 calculates C1, the processor 202 reuses the result of the B1 calculation (i.e., retrieves the result from the cache location) so that, in order to calculate (or recalculate) C1, the processor 202 only needs to calculate SUM(B1:B100).

According to various embodiments, a computing device can use one or more of the processes described above to calculate the degree of criticality or fragility of a reference element. For example, given a cell of a spreadsheet ("cell X"), criticality is a relative measure of the count of other cells whose values are in some way dependent on cell X. For example, a first cell is considered more critical than a second cell if the count of cells directly or indirectly dependent on the first cell is greater than the same count on the second cell. Conversely, given a cell ("cell Y"), fragility is a relative measure of the count of other cells upon which cell Y directly or indirectly depends. For example, a first cell is considered more fragile than a second cell if the count of cells upon which the first cell directly or indirectly depends is greater than the same count on the second cell. Dependents and dependencies may be due to a formula reference or some other mechanism that establishes a directional or bidirectional link between at least two cells.

For example, in the context of the computing device of FIG. 2A or FIG. 2B, the processor 202 can, in an embodiment, determine which other cells depend on each cell by searching the first and second dependency graphs 222 and 224 (or the second RTree 254), count the number of dependents located for each search, and designate those cells whose number of dependents exceeds a predetermined threshold as critical. Put another way, the processor 202 takes a given cell and searches the dependency graphs 222 and 224 (or the second RTree 254) to find out which cell ranges are "interested" in that cell. The processor 202 obtains the list of ranges (e.g., a list of range objects, each range object including the spreadsheet location of each cell "interested" in that range). The processor 202 then searches the dependency graphs 222 and 224 (or the second RTree 254) again to determine which cells are interested in this first set of retrieved cells. The processor 202 carries out this search procedure recursively until either it fails to find any more dependents or begins finding cells that it had previously located (which may occur if there are cells in a circularly-dependent relationship).

The processor 202 may then highlight the cells designated to be critical on the graphical user interface 219 (e.g., in particular color, such as green). Alternatively, the processor 202 may rank the cells in order of criticality, and display a corresponding ranked list of the cells on the user interface 219.

In another example, the processor 202 can, in an embodiment, determine which other cells each cell depends on by analyzing the AST of the formula for each cell and searching the range tree 220 (or the first RTree 252). For example, the processor 202 takes each cell having a formula, finds out which cell ranges the formula depends on from the AST of the formula, and searches the range tree 220 (or the first RTree 252) to find the cells in those ranges that have formulas. The processor 202 then iterates over each of those cells, calculating the count of each cell's dependents by iteratively searching the range tree 220 (or the first RTree 252) for each successive set of formulas located. The processor 202 designates those cells whose number of dependencies on other cells exceeds a predetermined threshold as fragile. The processor 202 may then highlight the cells designated to be fragile on the graphical user interface 219 (e.g., in particular color, such as red). Alternatively, the processor 202 may rank the cells in order of fragility, and display a corresponding ranked list of the cells on the user interface 219.

To illustrate one possible way in which the graphical user interface 219 may be implemented according to an embodiment, FIG. 9A shows an example of a spreadsheet. The spreadsheet 900 includes a number of cells that are interdependent either through a link (cells C10 and C18) or through formulas. FIG. 9B shows the various formulas and links in their respective cells. If, for example, the spreadsheet 900 is being displayed by the processor 202, the processor 202 could carry out any of the procedures described above to maintain and identify dependencies and, in response to a user request (e.g., a pull-down menu selection of "Show Dependencies"), render, on the graphical user interface 219, the representation of FIG. 9C, in which the different cells having formulas or links are shown in their relative locations on the spreadsheet 900, but with the rest of the spreadsheet being hidden or shaded. Additionally, the processor 202 could show the various edges of a graph (along with directional arrows to indicate which element depends on which). In this example, assuming that criticality is measured by the number of formulas that depend, either directly or indirectly, from a cell, then cell D10 would be the most critical of the spreadsheet 900 (as it is depended upon by D12, C18, C19, C10, and C12). The processor 202 could highlight cell D10 in green to indicate this characteristic. On the other hand, assuming that fragility is measured by the number of cells that a cell depends on, either directly or indirectly, then cell C12 would be the most fragile of the spreadsheet 900 (as it depends on C11, D11, C10, C5, C19, C17, C18, C16, and D10). The processor 202 could highlight cell C12 in red to indicate this characteristic.

According to an embodiment in which the architecture of FIG. 2B is used, the processor 202 sets the MBRs of the first RTree 252 so that each MBR is only one column wide. In other words, for each block of cells that has multiple columns, the processor 202 breaks up the MBR by column. This technique conveys a significant technical advantage in terms of reducing search time and retrieval time needed by the processor 202 (i.e., needed by the computing device) and reducing the processing resources consumed by the computing device. One reason for this is that for the most common table-based application—a spreadsheet—calculations tend to be columnar (e.g., SUM operations). An example that illustrates this advantage will now be described with reference to FIG. 10A, FIG. 10B, FIG. 11A, and FIG. 11B.

For this example, assume that a user of the second computing device 104 has logged into the productivity software 101 and, using the productivity software 101, opens up a spreadsheet 1000 (FIG. 10A). The user imports two sets of data (e.g., from locally-stored comma-separated value ("csv") files) into the spreadsheet 1000 at two different times. The first set of data populates the cells marked with 'x' in FIG. 10A and the second set of data populates the cells marked with 'y.' Many other cells of the spreadsheet might have values or formulas as well.

Turning to FIG. 11A, in response to the import of the first set of data, the first computing device 100 inserts a first node 1102 into the RTree 252. The first node 1102 includes data representing a first MBR 1002 (FIG. 10A) that encompasses the cells of the first data set—cells D1-D5, E5-E20, and Z50-Z100. In response to the import of the second set of data, the first computing device 100 inserts a second node 1104 into the RTree 252. The second node 1102 includes data representing a second MBR 1004 (FIG. 10A) that encompasses the cells of the second data set—cells B1, C1, and F6-F8. Note that the representation of the RTree 252 in FIG. 11A is simplified for the sake of illustration. In addition to what is depicted, there may be many nodes between the first and second nodes 1102 and 1104 and the root node (depicted in phantom with reference numeral 1106). Additionally, the first node 1102 has child nodes 1108, 1110, and 1112, while the second node 1104 has child nodes 1114 and 1116 that contain actual references to cells.

Further assume that the user attempts to carry out an operation that requires the first computing device 100 to query the RTree 252 for cell F9. Because F9 is within the first MBR 1002, the first computing device will need to retrieve all of the leaf nodes under the first node 1102 and, possibly, many if not all of the cells represented by those leaf nodes. Since the area encompassed by the first MBR 1002 is large in proportion to the actual cells occupied within the area, the first computing device 100 will need to import potentially many, many nodes in order to determine that F9 is not under the first node 1102. This represents wasted searching and retrieval time by the first computing device 100 as well as a waste of processing resources (e.g., active threads used by first computing device 100).

To improve performance according to an embodiment, instead of defining the first MBR 1002 according to the outermost limits of area encompassing all of the cells in the first data set, the first computing device 100 breaks the area up by column. Referring to FIG. 10B, for the first data set the first computing device 100 establishes a first MBR 1020 for the cells in Column D, a second MBR 1022 for the cells in column E, and a third MBR 1024 for the cells in Column Z. Referring to FIG. 11B, the first computing device 100 inserts data representing the first MBR 1020, the second MBR 1022, and the third MBR 1024 into the first node 1102. For the second data set, the computing device 100 establishes a first MBR 1026 for the cells in Column B, a second MBR 1028 for the cells in Column C, and a third MBR 1030 for the cells in Column F. Referring again to FIG. 11B, the first computing device 100 inserts data representing the first MBR 1026, the second MBR 1028, and the third MBR 1030 into the second node 1104. Thus, if the user attempts to carry out an operation that requires the first computing device 100 to query the RTree 252 for cell F9 (e.g., the user wants to sum all values in Column F from F1 to F9 and put the result in F10), the first computing device 100 will, in its traversal down the RTree 252, find out that the MBRs of the first node 1102 (in FIG. 11B) do not include that cell and will not bother retrieving further nodes down any path leading from the first node 1102.

According to an embodiment, the first computing device 100 maintains the RTree 252 in an immutable manner. In other words, the first computing device 100 persists each version of the RTree 252 within the data store 250 by refraining from deleting old versions of nodes. Instead of deleting old versions of nodes, the first computing device 100 creates new versions (where appropriate) and changes the references between nodes (e.g., changes the pointers from parent nodes to child nodes). For example, assume that node 1116 changes (e.g., due to some sort of change in the spreadsheet 1000 of FIG. 10B). The first computing device 100 would respond by creating a new version of the node 1116—shown in FIG. 11C as node 1116a, which included the appropriate post-change data. The first computing device 100 would also create a new root—shown as node 1106a (since the MBRs need to be updated)—and creates new versions of the rest of the nodes in the branches leading to node 1116a. The first computing device 100 would also link the new root node 1106a to the new versions of the various intermediate branch nodes and to the original versions of the nodes along the branch that did not change. Using immutably-managed data structures helps to ensure that the entire change history of the RTree 252 is preserved.

In an embodiment, one or more of the computing devices of FIG. 1 maintains a map that includes mappings between coordinates (e.g., row and column) of cells of a table that is displayed (e.g., on a display device) and coordinates of nodes in an RTree that contain MBRs whose range encompasses the cells. In effect, such mapping allows for the use of virtual coordinates. For many types of changes to the RTree 252, the use of virtual coordinates reduces the number of nodes of the RTree 252 that need to be updated.

Figure 12A:
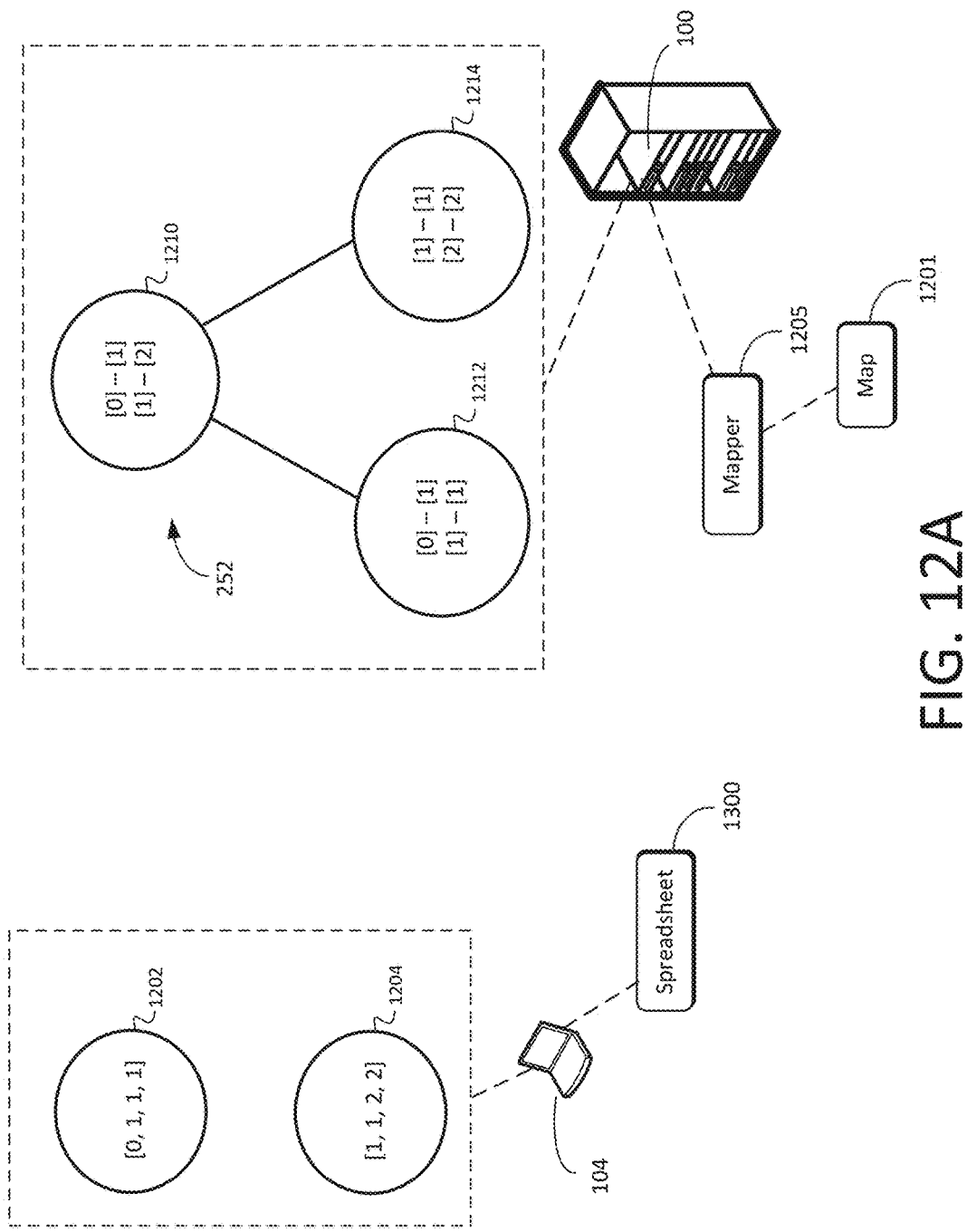
Figures 13A, 13B, 13C, 13D:
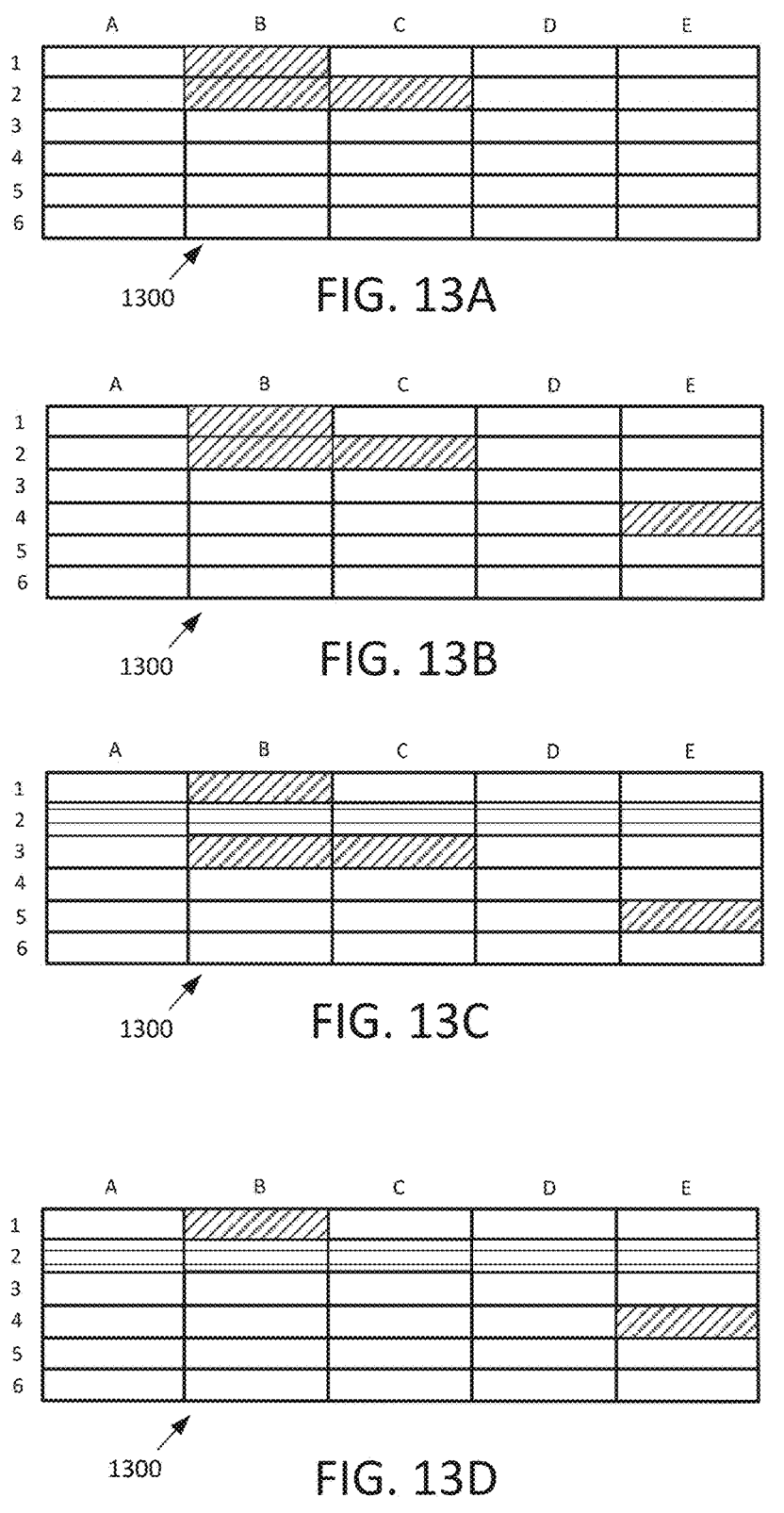

Turning to FIGS. 12A-12D and FIGS. 13A-13D, an example of how virtual coordinates may be implemented according to an embodiment will now be described. In this example, it will be assumed that the second computing device 104 maintains the coordinates of a spreadsheet that is visually displayed on the second computing device 104 and the first computing device 100 maintains the coordinates of the corresponding nodes of the first RTree 252 that contain the MBRs of the occupied cells. In this example, the initial state of the spreadsheet 1300 is shown in FIG. 13A and the initial state of the coordinates of the displayed spreadsheet, the initial state of the map (which is depicted with block 1201), and the initial state of the first RTree 252 are shown in FIG. 12A. Initially, cells B1, B2, and C2 are occupied, and the second computing device 104 maintains references to the values or formulas contained in these cells based on their display coordinates in nodes 1202 and 1204 (with values [0, 1, 1, 1] and [1, 1, 2, 2]). The first computing device 100 maintains the MBR ranges in nodes 1210, 1212, and 1214. The first computing device 100 also executes a virtual coordinate mapper 1205 that maps the display coordinates (from the client side) to the internal (i.e., node) coordinates on the RTree 252 and vice versa. The mapping in the initial state is as follows:

Rows
0⇔[0, 0]
1⇔[1, 0]
Columns
1⇔[1, 0]
2⇔[2, 0]

In this example, the left value is the display coordinate and the right value is the node coordinate. The node coordinates are shown in the format [Whole, Fractional]. In other words, the node coordinates have a whole number component and a fractional number component. The nodes of the RTree in this example are ordered based on range, with the range attributes being stored as internal coordinates (coordinates of the RTree 252). The ranges of the RTree 252 are expressed as:

[Start Row]-[Stop Row]
[Start Column]-[Stop Column]

As shown in FIG. 12A, the first computing device 100 stores the range attributes in nodes 1212 and 1214.

Continuing with the example (FIG. 13B), in a first operation, a user on the second computing device 104 adds a cell (e.g., inserts a value into the cell) at display location E4 (represented in the memory of the second computing device 104 as a node 1206 containing the values [3, 3, 4, 4]). The virtual coordinate mapper maps the display coordinates of the new cell to the node coordinates as follows:

Row
3⇔[3, 0]
Column
4⇔[4, 0]

Figure 12B:
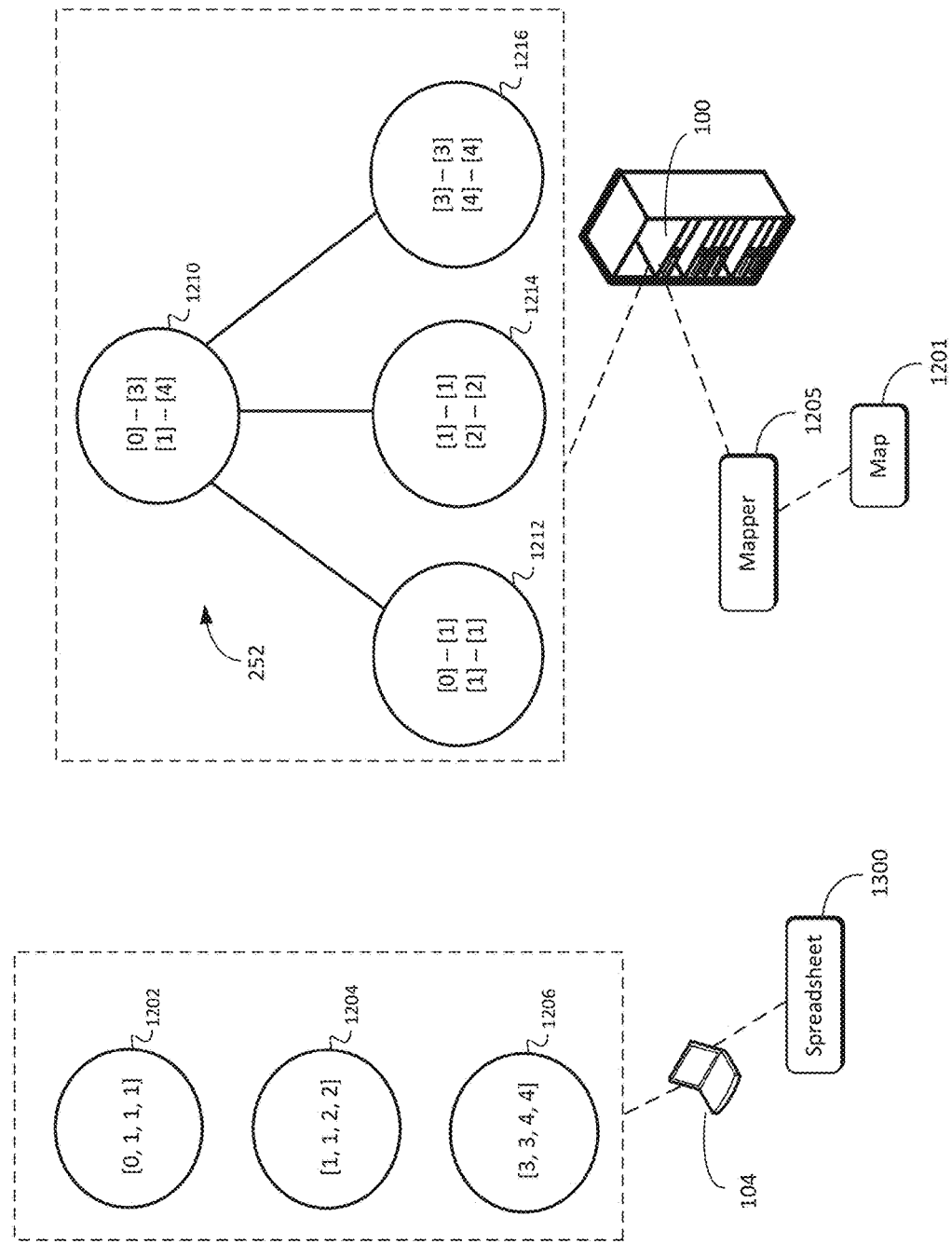

The first computing device 100 responds by adding a fourth node 1216 to the RTree 252, with a node coordinate of [3, 3, 4, 4], as shown in FIG. 12B.

In a second operation, a user on the second computing device 104 inserts a row (e.g., shifts cells, shifts partial row(s), or shifts complete row(s)) at Row 2 of the spreadsheet 1300 (FIG. 13C). The virtual coordinate mapper 1205 updates the mapping of the display coordinates to the node coordinates for the rows to include a fractional value (of 0.5) for Row 2 (which has been pushed down to Row 3) and to map new Rows 3 and 5 to the same node coordinates as old Rows 2 and 4. The column mappings remain unchanged:

Rows
0⇔[0, 0]
1⇔[0, 0.5]
2⇔[1, 0]
4⇔[3, 0]

Columns
1⇋[1, 0]
2⇋[2, 0]
4⇋[4, 0]

Figure 12C:
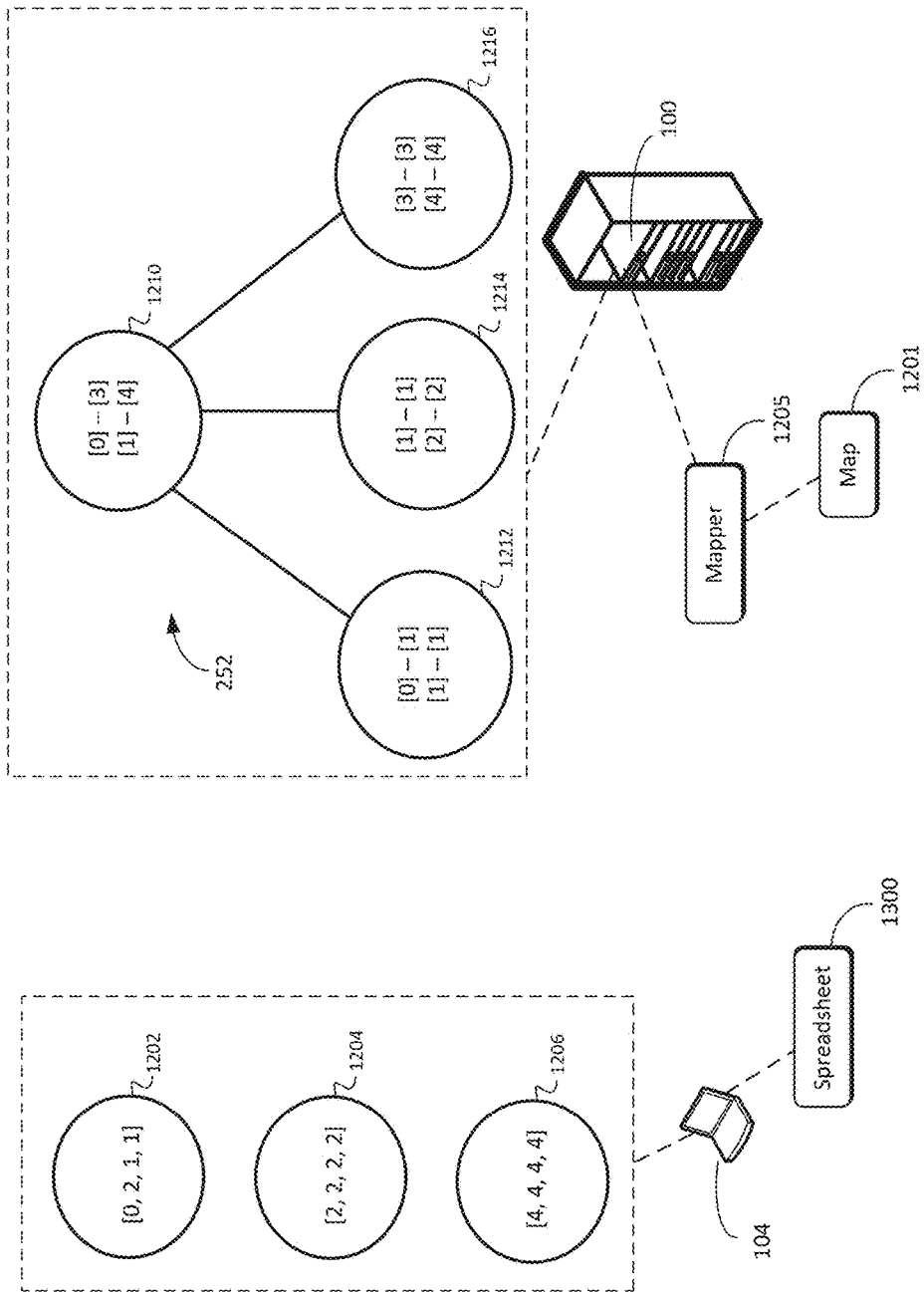

The first computing device 100 does not need to update the RTree 252, i.e., the RTree 252 in FIG. 12C is the same as the RTree 252 in FIG. 12B. This reduces the amount of work that the first computing device 100 needs to perform and reduces the number of accesses the first computing device 100 needs to make to the data store 250. From the user's point of view, the improvement may be very significant (e.g., a 0.1 second delay versus a 10 second delay—depending on how many nodes in the RTree would have had to be updated if not for the use of virtual coordinates).

In an embodiment, the first computing device 100 calculates the fractional component of the coordinate of the newly added node as follows: Find the lexical midpoint between existing mappings adjacent to the inserted row and map the inserted row to this value. The first computing device shifts all subsequent mappings accordingly.

In a third operation, a user on the second computing device 104 deletes Row 3 of the spreadsheet. The second computing device 104 updates the display coordinates as shown in FIG. 12D (deleting the node 1204 representing the deleted row). The virtual coordinate mapper updates the mapping of the display coordinates by deleting the entry for Row 3 and mapping new Row 4 to the same node coordinates as old Row 5 (which has now shifted up). The remainder of the mappings remain unchanged:

Rows
0⇋[0, 0]
1⇋[0, 0.5]
3⇋[3, 0]
Columns
1⇋[1, 0]
2⇋[2, 0]
4⇋[4, 0]

For nodes with ranges containing start or stop rows corresponding to the deleted the node, the first computing device 100 updates and re-inserts those nodes, or deletes them if both the start and stop row correspond to the deleted row. In this example, the first computing device 100 deletes the node 1214 representing Row 3 from the RTree 252, as shown in FIG. 12D.

According to an embodiment, a method for maintaining dependencies among multiple reference elements (e.g., formulas of a table or spreadsheet) involves the following: prior to a reevaluation operation carried out on the reference elements, a computing device (or processor thereof) receives an input of a reference element via a user interface (e.g., receives a user's input of a formula), assigns the reference element to a group based on the dependency (e.g., one-way dependency or two-way dependency) between the reference element and one or more other reference elements, and assigns the reference element to a location within a dependency graph to which the other reference elements are assigned. In response to an event that requires at least one of the reference elements to be reevaluated (e.g., the input or change of a constant or of a formula on which at least one of the other formulas relies), the computing device reevaluates each group of reference elements (e.g., recalculates each group of formulas) in sequence a group at a time (e.g., all of the formulas in group zero, then all of formulas in group one, etc.). In reevaluating the reference elements of each group, the computing device reevaluates the reference elements in parallel (e.g., recalculates all of the formulas in group zero in parallel, each recalculation being carried out on a separate thread of execution and, if available, on a separate processor or processor core). The computing device displays the results of the reevaluation operation on a display device in communication with the computing device (e.g., integrated with the computing device or integrated with another computing device remotely located from, but in communication with, the first computing device). Displaying the results may involve displaying a table with the results of a formula recalculation or displaying a spreadsheet with the results of a formula recalculation.

Possible implementations of reference elements include formulas, links, a combination of formulas and links that are located (1) in different cells of a single spreadsheet, (2) in different cells of a table embedded in a non-spreadsheet document, (3) distributed across multiple spreadsheets or multiple documents.

In an embodiment, a computing device maintains dependencies among reference elements (e.g., of a table) by maintaining an interval-based dependency graph in a computer memory such that each node of the graph is associated with at least one of the reference elements, and each node of the graph represents a range of locations of the reference elements (e.g., cells of the table). The computing device assigns a group identifier to each reference element such that no two reference elements having the same group identifier are related by dependency, either one-way or two-way. In response to an event requiring the reevaluation of one or more of the reference elements of the plurality, the computing device reevaluates the one or more reference elements, sequentially by group, according to the respective group identifiers of the one or more reference elements, and displays the result of the reevaluation (e.g., in the table) on a display device According to an embodiment, the computing device maintains an interval-based dependency graph and a range tree in a computer memory. Each node of the dependency graph (1) is associated with one or more formulas of a spreadsheet, and (2) represents a range of cells of the spreadsheet on which the one or more formulas associated with the node depends. Each node of the range tree represents a formula of the spreadsheet and is positioned within the range tree according to the location of the formula within the spreadsheet (e.g., positioned according to the row and column of the cell of the spreadsheet in which it resides).

To determine the criticality of a given reference element (e.g., a given formula of a spreadsheet) according to an embodiment, the computing device (1) searches the dependency graph to identify other reference elements that depend on the given reference element, (2) repeats the searching of the dependency graph to find the reference elements that depend on the first set of reference elements identified, the second set, and so on, until there are no further, non-circular reference elements that depend on the given reference element, (3) determines the criticality of the given reference element based on the total number of reference elements that depend either directly or indirectly on the given reference element, and (4) visually indicates the determined criticality of the given reference element on a display device.

To determine the fragility of a given reference element (e.g., a given formula of a spreadsheet) according to an embodiment, the computing device (1) analyzes the abstract syntax tree ("AST") of the given reference element to determine which locations (e.g., which other formulas contained in relied-upon cells) the given reference element depends on, (2) searches the range tree to determine which of those locations contain reference elements that the given reference element depends on, (3) repeats the AST analysis and the range tree search for each of the first set of reference elements located in the range tree search, the second set of reference elements located in the subsequent search, and so on, until there are no further, non-circular reference elements that depend on the given reference element, (4) determines the fragility of the given reference element based on the total number of reference elements that the given reference element depends directly on or indirectly on, and (5) visually indicates the determined fragility of the given reference element on a display device.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope.

What is claimed is:

1. A data storage and retrieval system, comprising:
a first computing device communicatively linked to a second computing device and to an external data store, the first computing device comprising a memory having stored thereon an RTree representing a structure of a spreadsheet displayed on the second computing device,
wherein the RTree is configured according to a map,
wherein the RTree comprises a plurality of nodes, at least some of which contain one or more minimum bounding rectangles, each minimum bounding rectangle encompassing coordinates of one or more cells of the spreadsheet,
wherein the spreadsheet comprises a first row and a second row,
wherein the map comprises
a mapping between a coordinate of the first row as displayed and a coordinate of a first node of the RTree, and
a mapping between a coordinate of the second row as displayed and a coordinate of a second node of the RTree,
the first computing device configured to carry out steps comprising
retrieving the plurality of nodes from the data store;
in response to a row being inserted between the first row and the second row of the spreadsheet as displayed, and without retrieving further nodes from the data store, updating the map to include a mapping between the inserted row and a fractional coordinate that is between the coordinate of the first node and the coordinate of the second node and leaving the RTree unchanged; and
in response to a row of the spreadsheet being deleted, updating and re-inserting nodes with ranges containing start or stop rows corresponding to the deleted row.

2. The data storage and retrieval system of claim 1, wherein the fractional coordinate is the lexical midpoint between the coordinate of the first row and the coordinate of the second row.

3. The data storage and retrieval system of claim 1, wherein the plurality of nodes of the RTree are ordered based on the ranges encompassed by the plurality of minimum bounding rectangles.

4. A method of storing and retrieving data, the method carried out on a first computing device that is communicatively linked to a second computing device that displays a spreadsheet that includes a plurality of occupied cells and to an external data store, the method comprising:

the first computing device
maintaining nodes of an RTree, wherein the nodes contain minimum bounding rectangles of the plurality of occupied cells;
mapping display coordinates of the plurality of occupied cells to coordinates of the nodes;
retrieving the plurality of nodes from the data store;
in response to a row being inserted into the spreadsheet between adjacent rows of the spreadsheet as displayed, and without retrieving further nodes from the data store, updating the mapping to include a fractional coordinate of one of the nodes, which contains a minimum bounding rectangle for the inserted row, and leaving the RTree unchanged; and
in response to a row of the spreadsheet being deleted, updating and re-inserting nodes with ranges containing start or stop rows corresponding to the deleted row,
wherein the fractional coordinate is between coordinates of nodes containing minimum bounding rectangles for the adjacent rows.

5. The method of claim 4, further comprising the second computing device:
visually displaying the spreadsheet on a display device;
maintaining the display coordinates of the occupied cells;
maintaining references to values or formulas contained in the occupied cells; and
receiving a user input indicating the insertion of the row.

6. The method of claim 4, further comprising: in response to the row being deleted from the spreadsheet, deleting one of the maintained nodes, wherein the deleted node includes a minimum bounding rectangle for the deleted row.

7. A method for storing data to and retrieving data from a computer memory, the method carried out by a first computing device and comprising:
configuring the computer memory according to an RTree representing a structure of a spreadsheet displayed on a second computing device;
configuring the RTree according to a map,
wherein the RTree comprises a plurality of nodes, at least some of which contain one or more minimum bounding rectangles, each minimum bounding rectangle encompassing coordinates of one or more cells of the spreadsheet,
wherein the spreadsheet comprises a first row and a second row,
mapping a coordinate of the first row as displayed to a coordinate of a first node of the RTree;
mapping a coordinate of the second row as displayed to a coordinate of a second node of the RTree;
retrieving the plurality of nodes from the data store;
in response to a row being inserted between the first row and the second row of the spreadsheet as displayed, and without retrieving further nodes from the data store, updating the map to include a mapping between the inserted row to a fractional coordinate that is between the coordinate of the first node and the coordinate of the second node and leaving the RTree unchanged; and
in response to a row of the spreadsheet being deleted, updating and re-inserting nodes with ranges containing start or stop rows corresponding to the deleted row.

8. The method of claim 7, wherein the fractional coordinate is the lexical midpoint between the coordinate of the first row and the coordinate of the second row.

9. The method of claim 7, wherein the plurality of nodes of the RTree are ordered based on the ranges encompassed by the plurality of minimum bounding rectangles.

* * * * *